(12) United States Patent
Zhang

(10) Patent No.: US 12,476,631 B2
(45) Date of Patent: Nov. 18, 2025

(54) POWER SUPPLY DEVICE COMPRISING A PLURALITY OF SEMICONDUCTOR SWITCHES AND A MECHANICAL SWITCH CONNECTED IN SERIES

(71) Applicant: TOSHIBA MITSUBISHI-ELECTRIC INDUSTRIAL SYSTEMS CORPORATION, Chuo-ku (JP)

(72) Inventor: Xiaochen Zhang, Chuo-ku (JP)

(73) Assignee: TMEIC CORPORATION, Chuo-ku (JP)

( * ) Notice: Subject to any disclaimer, the term of this patent is extended or adjusted under 35 U.S.C. 154(b) by 211 days.

(21) Appl. No.: 18/041,946

(22) PCT Filed: Jun. 2, 2021

(86) PCT No.: PCT/JP2021/021062
§ 371 (c)(1),
(2) Date: Feb. 16, 2023

(87) PCT Pub. No.: WO2022/254627
PCT Pub. Date: Dec. 8, 2022

(65) Prior Publication Data
US 2023/0318594 A1  Oct. 5, 2023

(51) Int. Cl.
*H03K 17/082* (2006.01)
*H02M 1/34* (2007.01)

(52) U.S. Cl.
CPC .......... *H03K 17/0828* (2013.01); *H02M 1/34* (2013.01)

(58) Field of Classification Search
CPC ..... H03K 17/08; H03K 17/081–08116; H03K 17/0812–08128; H03K 17/0814–08148;
(Continued)

(56) References Cited

U.S. PATENT DOCUMENTS

2002/0057540 A1  5/2002  Ito et al.
2007/0159749 A1*  7/2007  Oka .................. H02M 7/487
                                                                         361/93.1
(Continued)

FOREIGN PATENT DOCUMENTS

JP          2-106158 A        4/1990
JP      2002-208850 A        7/2002
(Continued)

OTHER PUBLICATIONS

Korean Office Action issued Jul. 24, 2024in Korean Patent Application No. 10-2023-7006523, 15 pages (with unedited computer generated English language translation).
(Continued)

*Primary Examiner* — Thienvu V Tran
*Assistant Examiner* — Carlos O Rivera-Perez
(74) *Attorney, Agent, or Firm* — Oblon, McClelland, Maier & Neustadt, L.L.P.

(57) ABSTRACT

A plurality of semiconductor switches and a mechanical switch are connected in series between a first terminal and a second terminal. A plurality of voltage detectors are provided corresponding to the plurality of semiconductor switches, respectively, and detect terminal-to-terminal voltages of the corresponding semiconductor switches. A plurality of drivers are provided corresponding to the plurality of semiconductor switches, respectively, and turn off the corresponding semiconductor switches in response to control signals from a main controller. Each driver determines whether or not a terminal-to-terminal voltage of the corresponding semiconductor switch matches a terminal-to-terminal voltage of another semiconductor switch of the plurality of semiconductor switches, and outputs a result of determination. The main controller detects a cutoff abnormality in which the plurality of semiconductor switches are (Continued)

not turned off normally, based on the result of determination provided from each of the plurality of drivers.

9 Claims, 12 Drawing Sheets

(58) Field of Classification Search
CPC .......... H03K 17/082–0828; H03K 17/12–127; H03K 17/567; H01H 9/54; H01H 9/541; H01H 9/542; H01H 9/547; H01H 9/548; H02H 3/00; H02H 3/02; H02H 3/05; H02J 9/00; H02J 9/04; H02J 9/06; H02J 9/062; H02M 1/32; H02M 1/325; H02M 1/34–348; H02M 7/66; H02M 7/68; H02M 7/575
USPC .. 361/62, 65, 67, 68, 75, 78, 79, 86, 88–92, 361/93.1, 94, 100, 101, 102, 109; 323/223–226, 268, 271–278, 282–285, 323/351; 363/16, 17, 40–48, 50–58, 106, 363/108, 109, 125, 131–134
See application file for complete search history.

(56) References Cited

U.S. PATENT DOCUMENTS

| | | | |
|---|---|---|---|
| 2015/0155711 A1* | 6/2015 | Kanayama | H02J 9/062 307/80 |
| 2021/0057997 A1 | 2/2021 | Zhang et al. | |
| 2021/0242770 A1 | 8/2021 | Zhang et al. | |
| 2022/0320893 A1* | 10/2022 | Hattori | H02M 1/32 |

FOREIGN PATENT DOCUMENTS

| | | |
|---|---|---|
| JP | 2015-109740 A | 6/2015 |
| JP | 6666526 B1 | 2/2020 |
| KR | 10-2020-0106205 A | 9/2020 |
| KR | 10-2021-0018466 A | 2/2021 |

OTHER PUBLICATIONS

International Search Report mailed on Aug. 10, 2021 in PCT/JP2021/021062 filed on Jun. 6, 2021 (2 pages).
Indian Office Action issued Mar. 5, 2024 in Indian Application 202317009718, 6 pages.

* cited by examiner

FIG.6

|  | DET1 | DET2 | DET3 | DET4 | RESULT OF DETERMINATION |
|---|---|---|---|---|---|
| CASE 1 | L | L | L | L | SW1 TO SW4 ARE NORMAL |
| CASE 2 | H | L | L | H | SW4 HAS CUTOFF ABNORMALITY |
| CASE 3 | H | L | L | L | GD1 OR GD2 HAS FAILURE |

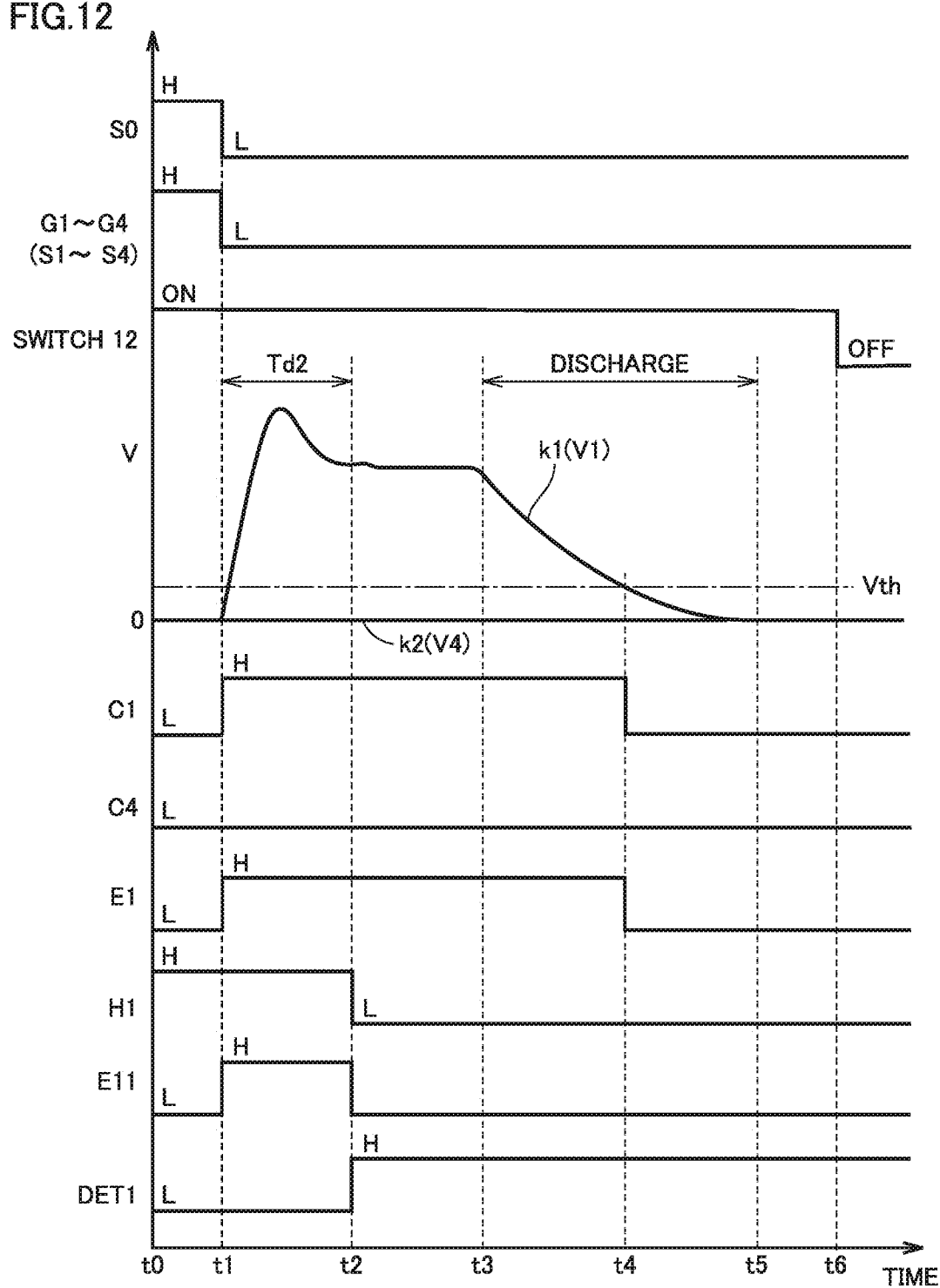

POWER SUPPLY DEVICE COMPRISING A PLURALITY OF SEMICONDUCTOR SWITCHES AND A MECHANICAL SWITCH CONNECTED IN SERIES

TECHNICAL FIELD

The present disclosure relates to a power supply device.

BACKGROUND ART

Japanese Patent Laying-Open No. H02-106158 (PTL 1) discloses a power conversion device having a circuit configured by connecting a plurality of self-arc-extinguishing semiconductor switching elements in series. In PTL 1, each semiconductor switching element is provided with detection means for detecting that the semiconductor switching element cannot be cut off. The detection means is configured to detect that the semiconductor switching element cannot be cut off, using a terminal-to-terminal voltage of a GTO (Gate Turn-Off thyristor) serving as the semiconductor switching element.

CITATION LIST

Patent Literature

PTL 1: Japanese Patent Laying-Open No. H02-106158

SUMMARY OF INVENTION

Technical Problem

A multiple power compensator is an exemplary power supply device for supplying alternating current (AC) power to a load. Generally, the multiple power compensator is connected between an AC power supply and the load, and is configured to uninterruptedly supply stable AC power to the load even when a power failure or an instantaneous voltage drop occurs in the AC power supply.

Some multiple power compensators have a mechanical switch and a switch circuit connected in series between the AC power supply and the load. The switch circuit is configured by connecting a plurality of semiconductor switches in series. When the AC power supply is normal, the power supply device supplies AC power of the AC power supply to the load by conducting (turning on) the mechanical switch and the plurality of semiconductor switches. On the other hand, when a power failure or an instantaneous voltage drop occurs in the AC power supply, the power supply device cuts off (turns off) the mechanical switch and the plurality of semiconductor switches, and starts supplying power from a power storage device to the load through a power converter.

When there occurs a cutoff abnormality in which any of the plurality of semiconductor switches cannot be cut off in such a power supply device, within the switch circuit, a voltage difference between an input terminal and an output terminal of the switch circuit may be intensively applied to some semiconductor switches that are turned off normally. Therefore, means for detecting a cutoff abnormality of the plurality of semiconductor switches is required.

However, when both the mechanical switch and the switch circuit are turned off, most of a voltage difference between an input terminal and an output terminal of the power supply device is applied to between terminals of the mechanical switch. This is because an off resistance (a resistance when the switch is turned off) of the mechanical switch is sufficiently larger than an off resistance of each semiconductor switch. Therefore, a terminal-to-terminal voltage of a semiconductor switch that is turned off normally is set to a value close to a zero voltage, and is less likely to exhibit a significant difference from a terminal-to-terminal voltage of a semiconductor switch having a cutoff abnormality. Therefore, using a terminal-to-terminal voltage of a semiconductor switch as described in PTL 1 may lead to erroneous detection of occurrence of a cutoff abnormality.

The present disclosure has been made to solve the aforementioned problem, and an object of the present disclosure is to accurately detect, in a power supply device including a plurality of semiconductor switches and a mechanical switch connected in series, a cutoff abnormality of the plurality of semiconductor switches.

Solution to Problem

A power supply device in accordance with one aspect of the present disclosure includes a first terminal that receives an AC voltage supplied from an AC power supply, a second terminal connected to a load, a plurality of semiconductor switches, a mechanical switch, a plurality of voltage detectors, and a control device. The plurality of semiconductor switches are connected in series between the first terminal and the second terminal. The mechanical switch is connected in series with the plurality of semiconductor switches, between the first terminal and the second terminal. The plurality of voltage detectors are provided corresponding to the plurality of semiconductor switches, respectively, and detect terminal-to-terminal voltages of the corresponding semiconductor switches. The control device includes a main controller and a plurality of drivers. The main controller controls turning on/off of the plurality of semiconductor switches and the mechanical switch based on the AC voltage received by the first terminal. The plurality of drivers are provided corresponding to the plurality of semiconductor switches, respectively, and turn off the corresponding semiconductor switches in response to control signals from the main controller. Each of the plurality of drivers includes a determination unit. The determination unit determines whether or not the terminal-to-terminal voltage of the corresponding semiconductor switch matches the terminal-to-terminal voltage of another semiconductor switch of the plurality of semiconductor switches, and outputs a result of determination. The main controller detects a cutoff abnormality in which the plurality of semiconductor switches are not turned off normally, based on an output signal of the determination unit provided from each of the plurality of drivers.

Advantageous Effects of Invention

According to the present disclosure, in a power supply device including a plurality of semiconductor switches and a mechanical switch connected in series, a cutoff abnormality of the plurality of semiconductor switches can be accurately detected.

BRIEF DESCRIPTION OF DRAWINGS

FIG. 6 is a view illustrating processing of determining a cutoff abnormality of the semiconductor switches in a main controller.

FIG. 12 is a timing chart showing operation of the gate driver.

DESCRIPTION OF EMBODIMENTS

Figure 1:
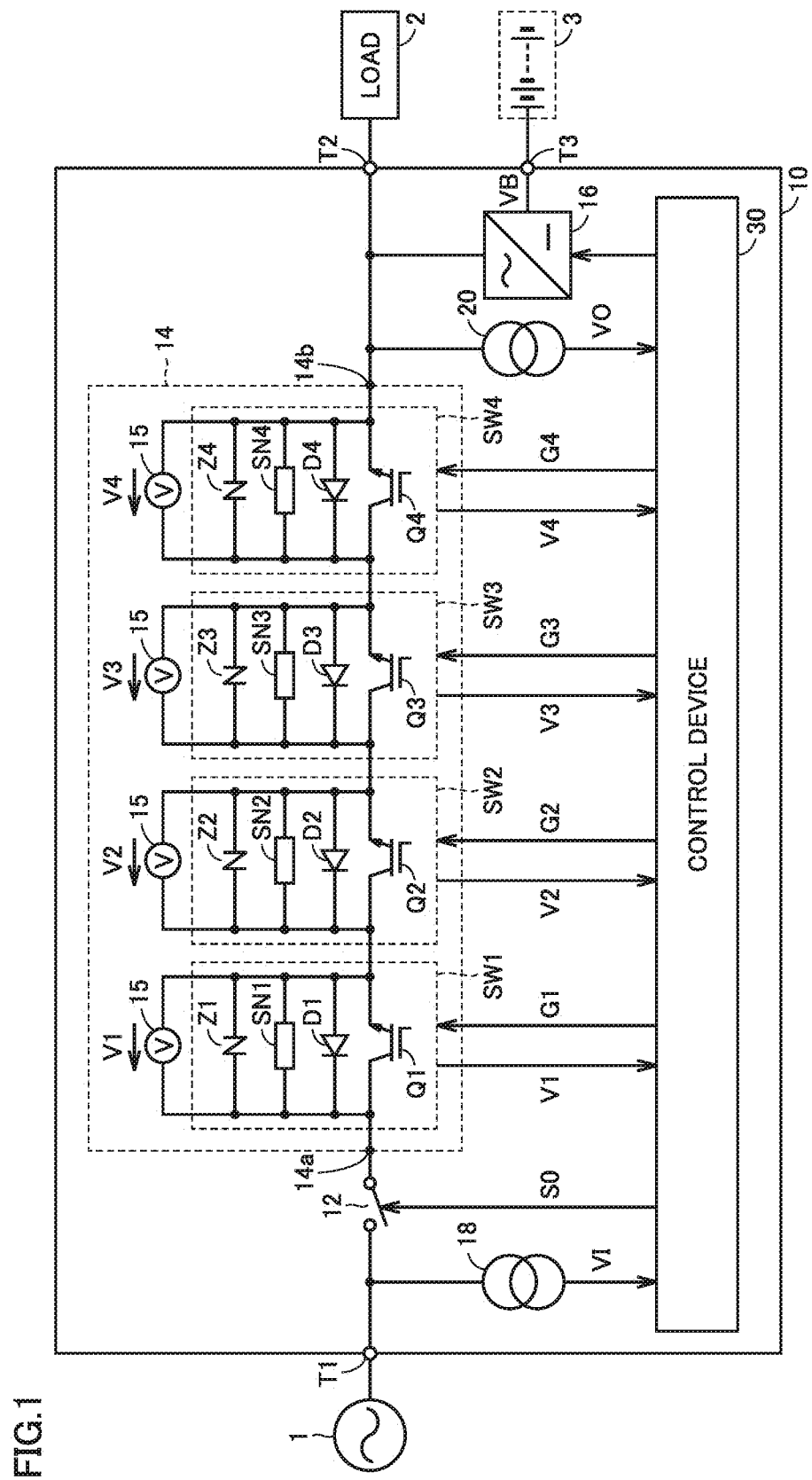
FIG. 1 is a view showing a schematic configuration of a power supply device in accordance with a first embodiment.

Hereinafter, embodiments of the present disclosure will be described in detail with reference to the drawings. It should be noted that, in the following, identical or corresponding parts in the drawings will be designated by the same reference numerals, and the description thereof will not be repeated in principle.

First Embodiment

FIG. 1 is a view showing a schematic configuration of a power supply device in accordance with a first embodiment.

As shown in FIG. 1, a power supply device 10 in accordance with the first embodiment is connected between an AC power supply 1 and a load 2, and is configured to receive AC power from AC power supply 1 and supply the AC power to load 2. Power supply device 10 is applicable, for example, to a device for uninterruptedly supplying stable AC power to load 2 when a power failure or an instantaneous voltage drop occurs in AC power supply 1 (for example, to a multiple power compensator).

AC power supply 1 is typically a commercial AC power supply, and supplies AC power having a commercial frequency to power supply device 10. Load 2 is driven by the AC power having the commercial frequency supplied from power supply device 10. It should be noted that, although FIG. 1 shows only a portion related to one-phase AC power, power supply device 10 may receive three-phase AC power and output the three-phase AC power.

As shown in FIG. 1, power supply device 10 includes an input terminal T1, an output terminal T2, a direct current (DC) terminal T3, a mechanical switch 12, a switch circuit 14, a bidirectional converter 16, voltage detectors 15, 18, and 20, and a control device 30.

Input terminal T1 is electrically connected to AC power supply 1, and receives an AC voltage VI having the commercial frequency supplied from AC power supply 1. Input terminal T1 corresponds to one embodiment of a "first terminal".

Mechanical switch 12 is electrically connected between input terminal T1 and output terminal T2. Mechanical switch 12 is conducted (turned on) in response to a control signal S0 at an H (logic high) level provided from control device 30, and is cut off (turned off) in response to control signal S0 at an L (logic low) level. It should be noted that, when mechanical switch 12 receives control signal S0 at the L level in an ON state, mechanical switch 12 is turned off several tens of milliseconds after receiving control signal S0.

Output terminal T2 is connected to load 2. Load 2 is driven by an AC voltage VO supplied from output terminal T2. Output terminal T2 corresponds to one embodiment of a "second terminal".

DC terminal T3 is connected to a battery 3. Battery 3 corresponds to one embodiment of a "power storage device" for storing DC power. Instead of battery 3, an electric double layer capacitor may be connected to DC terminal T3, as a power storage device. An instantaneous value of a DC voltage VB of DC terminal T3 (a terminal-to-terminal voltage of battery 3) is detected by control device 30.

Switch circuit 14 is connected between input terminal T1 and output terminal T2 to be electrically in series with mechanical switch 12. Switch circuit 14 has an input node 14a, an output node 14b, and n semiconductor switches SW1 to SWn (n is an integer more than or equal to 2).

Input node 14a is electrically connected to input terminal T1 via mechanical switch 12, and output node 14b is connected to output terminal T2. Semiconductor switches SW1 to SWn are connected in series between input node 14a and output node 14b. In the example of FIG. 1, n is 4. However, number n of the semiconductor switches is not limited to 4.

Turning on/off of semiconductor switches SW1 to SWn is controlled by gate signals G1 to Gn, respectively, inputted from control device 30. In the following, when semiconductor switches SW1 to SWn are collectively described, they will also be simply referred to as "semiconductor switches SW", and when gate signals G1 to Gn are collectively described, they will also be simply referred to as "gate signals G".

A semiconductor switch SWi (i is an integer that is more than or equal to 1 and less than or equal to n) has an IGBT (Insulated Gate Bipolar Transistor) Qi, a diode Di connected in anti-parallel with IGBT Qi, a snubber circuit SNi, and a varistor Zi. IGBT Qi has a collector electrically connected to input node 14a, and an emitter electrically connected to output node 14b. Diode Di is connected, with a direction directed from output node 14b to input node 14a being defined as a forward direction. It should be noted that, for semiconductor switch SWi, any self-arc-extinguishing semiconductor switching element can be used instead of an IGBT. In the following, when IGBTs Q1 to Qn are collectively described, they will also be simply referred to as "IGBTs Q", when snubber circuits SN1 to SNn are collectively described, they will also be simply referred to as "snubber circuits SN", and when varistors Z1 to Zn are collectively described, they will also be simply referred to as "varistors Z".

Each semiconductor switch SW (IGBT Q) is turned on by gate signal G at an H level, and is turned off by gate signal G at an L level. That is, gate signal G at the H level corresponds to an ON command for turning on semiconductor switch SW (IGBT Q) (a conduction command), and gate signal G at the L level corresponds to an OFF command for turning off semiconductor switch SW (IGBT Q) (a cutoff command).

Snubber circuits SN1 to SNn are connected in parallel with IGBT Q1 to IGBT Qn, respectively, to protect the corresponding IGBTs Q from a surge voltage. Each snubber circuit SN has, for example, a resistive element and a capacitor connected in series between a collector and an emitter of a corresponding IGBT Q. When IGBT Q is turned off suddenly while a current is flowing through IGBT Q, a surge voltage is generated between the collector and the emitter of IGBT Q due to self-inductance. Snubber circuit SN protects IGBT Q by suppressing such a surge voltage.

Varistors Z1 to Zn are connected in parallel with IGBT Q1 to Qn, respectively. Each varistor Z is a resistor whose resistance value has voltage dependency. Varistor Z is a ZnR (Zinc oxide nonlinear resistor), for example. The resistance value of varistor Z changes according to a terminal-to-terminal voltage thereof, and decreases suddenly when it exceeds a predetermined threshold voltage. Therefore, varistor Z can prevent a voltage between the collector and the emitter of IGBT Q from exceeding the threshold voltage, and prevent IGBT Q from being damaged by a surge voltage.

Figure 2:
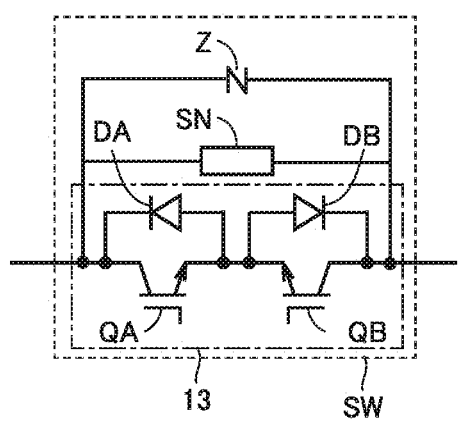
FIG. 2 is a circuit diagram showing another configuration example of semiconductor switches shown in FIG. 1.

It should be noted that semiconductor switches SW are not limited to have the configuration of FIG. 1, and can also have a configuration shown in FIG. 2, for example. In the example of FIG. 2, semiconductor switch SW has IGBTs QA and QB connected in anti-series with each other, diodes DA and DB connected in anti-parallel with IGBTs QA and QB, respectively, snubber circuit SN, and varistor Z. IGBT QA has a collector electrically connected to input node 14$a$, and an emitter connected to an emitter of IGBT QB. IGBT QB has a collector electrically connected to output node 14$b$. Diode DA is connected, with a direction directed from output node 14$b$ to input node 14$a$ being defined as a forward direction. Diode DB is connected, with a direction directed from input node 14$a$ to output node 14$b$ being defined as a forward direction. Snubber circuit SN and varistor Z are connected in parallel with a series circuit of IGBTs QA and QB.

Referring back to FIG. 1, bidirectional converter 16 is connected between output node 14$b$ of switch circuit 14 and DC terminal T3. Bidirectional converter 16 is configured to execute bidirectional power conversion between AC power outputted to output node 14$b$ and DC power stored in battery 3. Bidirectional converter 16 corresponds to one embodiment of a "power converter".

During a normal state in which the AC power is supplied from AC power supply 1, bidirectional converter 16 converts the AC power supplied from AC power supply 1 via switch circuit 14 into DC power and stores the DC power in battery 3. On the other hand, when there occurs a power failure in which the supply of the AC power from AC power supply 1 is stopped, or when there occurs an instantaneous voltage drop in AC power supply 1, bidirectional converter 16 converts the DC power in battery 3 into AC power having the commercial frequency, and supplies the AC power to load 2.

Bidirectional converter 16 has a plurality of semiconductor switching elements, although not shown. Turning on/off of the plurality of semiconductor switching elements is controlled by a control signal generated by control device 30. The control signal is a pulse signal sequence, and is a PWM (Pulse Width Modulation) signal. Bidirectional converter 16 can execute bidirectional power conversion between the AC power outputted to output node 14$b$ and the DC power inputted/outputted to DC terminal T3, by turning on or off the plurality of semiconductor switching elements in response to the control signal.

Voltage detector 18 detects an instantaneous value of AC voltage VI supplied from AC power supply 1 to input terminal T1, and provides a signal indicating a detection value thereof to control device 30. Control device 30 determines whether or not AC power supply 1 is normal, based on the instantaneous value of AC voltage VI. For example, when AC voltage VI is higher than a predetermined lower limit voltage, control device 30 determines that AC power supply 1 is normal. When AC voltage VI is lower than the lower limit voltage, control device 30 determines that AC power supply 1 is not normal (i.e., is abnormal).

Voltage detector 20 detects an instantaneous value of AC voltage VO appearing at output terminal T2, and provides a signal indicating a detection value thereof to control device 30.

Each voltage detector 15 detects an instantaneous value of a terminal-to-terminal voltage V of semiconductor switch SW, and provides a signal indicating a detection value thereof to control device 30. In the example of FIG. 1, each voltage detector 15 detects an instantaneous value of voltage V between the collector and the emitter of IGBT Q of each semiconductor switch SW. Detection values V1 to Vn detected by voltage detectors 15 correspond to terminal-to-terminal voltages of semiconductor switches SW1 to SWn, respectively. In the following, when terminal-to-terminal voltages V1 to Vn are collectively described, they will also be simply referred to as "terminal-to-terminal voltages V".

When semiconductor switch SW is in an ON state, terminal-to-terminal voltage V of semiconductor switch SW is set to a zero voltage. On the other hand, when semiconductor switch SW is in an OFF state, terminal-to-terminal voltage V of semiconductor switch SW has a value according to a voltage difference between AC voltage VI supplied to input terminal T1 and AC voltage VO appearing at output terminal T2. Thus, terminal-to-terminal voltage V of semiconductor switch SW ideally has values that are different depending on whether semiconductor switch SW is in the ON state or in the OFF state.

Control device 30 controls turning on/off of switch circuit 14 (semiconductor switches SW) and operation of bidirectional converter 16, using a command from a higher-order controller not shown, signals inputted from voltage detectors 18 and 20, and the like. Control device 30 can be configured, for example, by a microcomputer or the like. As an example, control device 30 has a CPU (Central Processing Unit) and a memory not shown, and can execute control operation described below by software processing performed by the CPU executing a program stored beforehand in the memory. Alternatively, the control operation can be partly or entirely implemented by hardware processing using a dedicated embedded electronic circuit and the like, instead of software processing.

Next, operation of power supply device 10 in accordance with the first embodiment will be described.

When AC power supply 1 is normal, control device 30 provides control signal S0 at the H level to mechanical switch 12, and provides gate signals G1 to Gn at the H level to semiconductor switches SW1 to SWn, respectively, of switch circuit 14. Since mechanical switch 12 and semiconductor switches SW1 to SWn of switch circuit 14 are turned on, the AC power is supplied from AC power supply 1 to load 2 via mechanical switch 12 and switch circuit 14, and load 2 is driven. Further, the AC power is supplied from AC power supply 1 to bidirectional converter 16 via mechanical switch 12 and switch circuit 14, and the AC power is converted into DC power and is stored in battery 3. On this occasion, control device 30 controls bidirectional converter 16 such that terminal-to-terminal voltage VB of battery 3 is set to a reference voltage VBr.

When AC power supply 1 is abnormal (when a power failure or an instantaneous voltage drop occurs in AC power supply 1), control device 30 provides control signal S0 at the L level to mechanical switch 12, and provides gate signals G1 to Gn at the L level to semiconductor switches SW1 to SWn, respectively, of switch circuit 14. Mechanical switch 12 and semiconductor switches SW1 to SWn of switch circuit 14 are turned off instantaneously, and the DC power in battery 3 is converted into AC power by bidirectional converter 16 and the AC power is supplied to load 2. Therefore, even when an abnormality occurs in AC power supply 1, operation of load 2 can be continued for a period in which the DC power is stored in battery 3. On this occasion, control device 30 controls bidirectional converter 16 based on AC voltage VO detected by voltage detector 20, such that AC voltage VO is set to a reference voltage VOr. When terminal-to-terminal voltage VB of battery 3 decreases and reaches a lower limit voltage, control device 30 stops operation of bidirectional converter 16.

It should be noted that, also when an element failure or a control abnormality occurs in switch circuit 14, the DC power in battery 3 is supplied to load 2 via bidirectional converter 16, by operating bidirectional converter 16 and turning off mechanical switch 12 and switch circuit 14. Therefore, even when an abnormality occurs in AC power supply 1 or switch circuit 14, it is possible to continue supplying stable power to load 2 uninterruptedly.

However, when there occurs an abnormality in which some of semiconductor switches SW1 to SWn cannot be cut off (hereinafter also referred to as a "cutoff abnormality") in switch circuit 14, an irregular state may occur during generation of gate signals G1 to Gn at the L level (cutoff commands). In the irregular state, these some semiconductor switches SW are not turned off and maintain the ON state, whereas remaining semiconductor switches SW are turned off. When such an irregular state occurs in semiconductor switches SW1 to SWn connected in series, a voltage difference between input node 14a and output node 14b is intensively applied to between terminals of remaining semiconductor switches SW in the OFF state. Therefore, there is a concern that an overvoltage may be applied to remaining semiconductor switches SW.

Accordingly, in the present embodiment, control device 30 is configured to detect a cutoff abnormality of semiconductor switches SW1 to SWn constituting switch circuit 14. In the following, processing of detecting a cutoff abnormality of switch circuit 14 in power supply device 10 in accordance with the first embodiment will be described.

Figure 3:
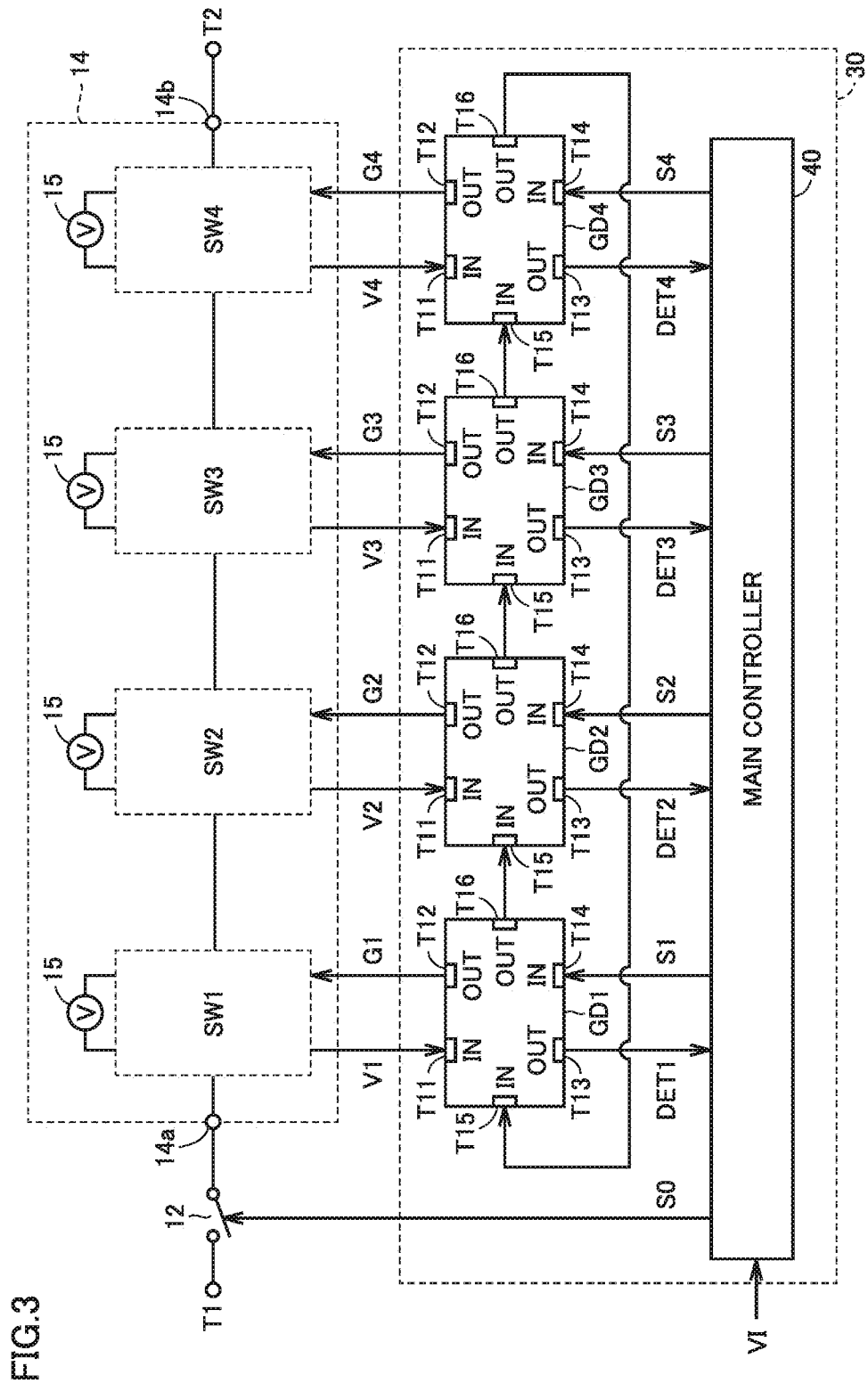
FIG. 3 is a circuit block diagram showing a configuration of a portion related to control of a mechanical switch and a switch circuit, of a control device shown in FIG. 1.

FIG. 3 is a circuit block diagram showing a configuration of a portion related to control of mechanical switch 12 and switch circuit 14, of control device 30 shown in FIG. 1. As shown in FIG. 3, control device 30 has a main controller 40 and a plurality of gate drivers GD1 to GDn.

Main controller 40 determines whether or not AC power supply 1 is normal, based on the instantaneous value of AC voltage VI detected by voltage detector 18. When AC voltage VI is higher than the lower limit voltage, main controller 40 determines that AC power supply 1 is normal. In this case, main controller 40 provides control signal S0 at the H level to mechanical switch 12, and provides control signals S1 to Sn at the H level to gate drivers GD1 to GDn, respectively.

On the other hand, when AC voltage VI is lower than the lower limit voltage, main controller 40 determines that AC power supply 1 is not normal. In this case, main controller 40 provides control signal S0 at the L level to mechanical switch 12, and provides control signals S1 to Sn at the L level to gate drivers GD1 to GDn, respectively. In the following, when gate drivers GD1 to GDn are collectively described, they will also be simply referred to as "gate drivers GD", and when control signals S1 to Sn are collectively described, they will also be simply referred to as "control signals S".

Gate drivers GD1 to GDn are provided corresponding to semiconductor switches SW1 to SWn, respectively. Gate drivers GD1 to GDn output gate signals G1 to Gn to semiconductor switches SW1 to SWn, respectively, in response to control signals S1 to Sn provided from main controller 40. Specifically, when control signal S is at the H level, gate driver GD outputs gate signal G at the H level to turn on semiconductor switch SW. When control signal S is at the L level, gate driver GD outputs gate signal G at the L level to turn off semiconductor switch SW.

Gate drivers GD1 to GDn receive output signals V1 to Vn of voltage detectors 15 provided in semiconductor switches SW1 to SWn, respectively. Gate drivers GD1 to GDn determine states of semiconductor switches SW1 to SWn based on output signals V1 to Vn of voltage detectors 15, and output signals DET1 to DETn indicating results of determination to main controller 40.

Each gate driver GD has input terminals T11, T14, and T15, and output terminals T12, T13, and T16. Input terminal T14 receives control signal S from main controller 40. Output terminal T12 is connected to a gate terminal of IGBT Q of corresponding semiconductor switch SW. Gate driver GD generates gate signal G based on control signal S inputted to input terminal T14, and outputs generated gate signal G to the gate terminal of corresponding IGBT Q via output terminal T12.

Input terminal T11 receives output signal V of voltage detector 15 from corresponding semiconductor switch SW. Output terminal T13 is connected to main controller 40. Gate driver GD outputs signal DET to main controller 40 via output terminal T13.

Input terminal T15 is connected to output terminal T16 of another gate driver GD. In the example of FIG. 3, input terminal T15 of gate driver GD2 is connected to output terminal T16 of gate driver GD1. Input terminal T15 of gate driver GD3 is connected to output terminal T16 of gate driver GD2. Input terminal T15 of gate driver GD4 is connected to output terminal T16 of gate driver GD3. Input terminal T15 of gate driver GD1 is connected to output terminal T16 of gate driver GD4. That is, input terminal T15 of a gate driver GDi (i is an integer that is more than or equal to 2 and less than or equal to n) is connected to output terminal T16 of a gate driver GDi−1. However, input terminal T15 of gate driver GD1 is connected to output terminal T16 of gate driver GDn.

Figure 4:
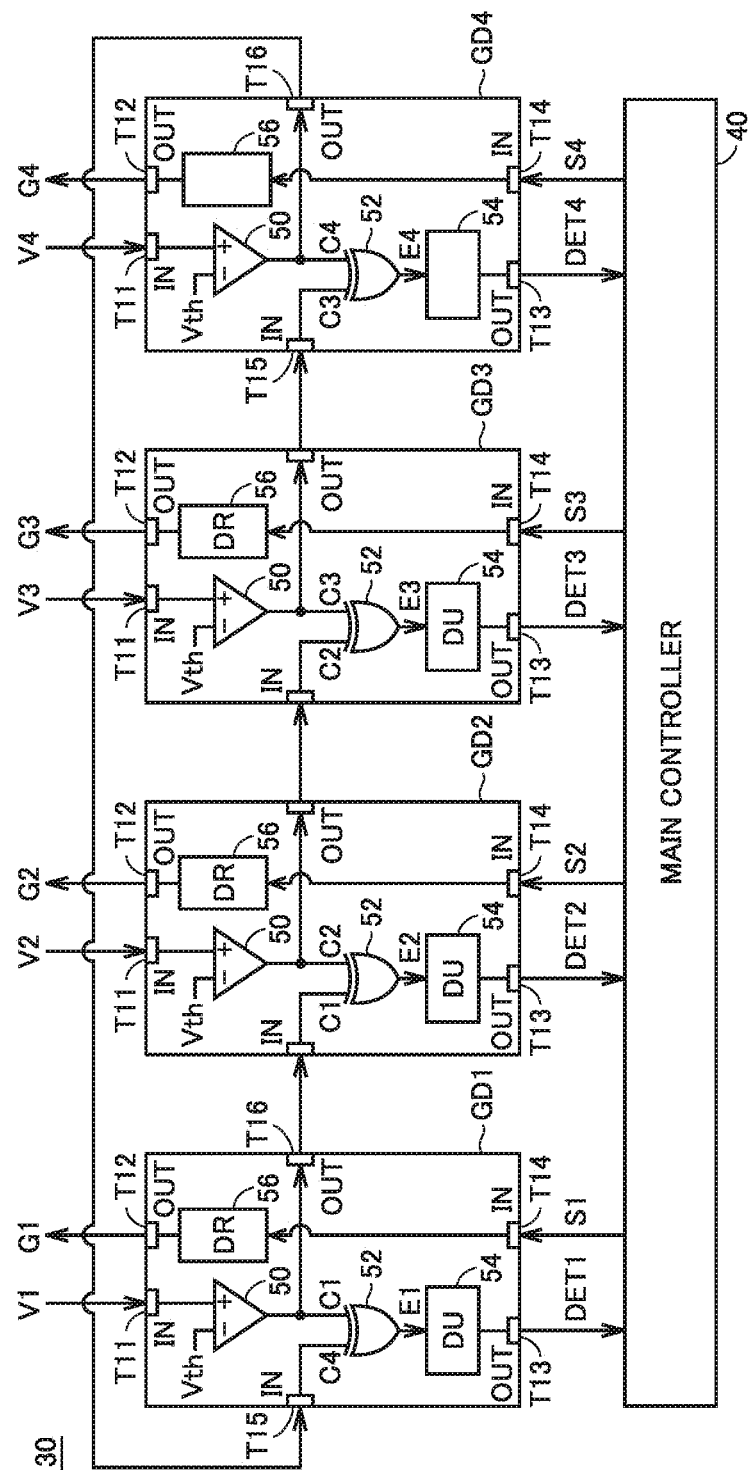
FIG. 4 is a circuit block diagram showing a configuration of gate drivers shown in FIG. 3.

FIG. 4 is a circuit block diagram showing a configuration of gate drivers GD shown in FIG. 3. As shown in FIG. 4, each gate driver GD has a comparator 50, an EXOR (exclusive logical sum) circuit 52, a determination unit 54, and a driver 56.

Driver 56 generates gate signal G based on control signal S provided to input terminal T14. Driver 56 outputs generated gate signal G to corresponding semiconductor switch SW (IGBT Q) via output terminal T12. When control signal S is at the H level, driver 56 outputs gate signal G at the H level. When control signal S is at the L level, driver 56 outputs gate signal G at the L level.

Comparator 50 compares output signal V of voltage detector 15 inputted to input terminal T1 with a threshold voltage Vth. Output signal V of voltage detector 15 indicates a detection value of terminal-to-terminal voltage V of semiconductor switch SW. As described above, when semiconductor switch SW is in the ON state, terminal-to-terminal voltage V is set to the zero voltage, and when semiconductor switch SW is in the OFF state, terminal-to-terminal voltage V has a value according to the voltage difference between AC voltage VI and AC voltage VO. Comparator 50 compares the detection value of terminal-to-terminal voltage V with threshold voltage Vth, and outputs a signal C indicating a result of comparison. When the detection value of terminal-to-terminal voltage V is larger than threshold voltage Vth, output signal C of comparator 50 is set to an H level. When the detection value of terminal-to-terminal voltage V is smaller than threshold voltage Vth, output signal C of comparator 50 is set to an L level.

Output signal C of comparator 50 is inputted to a first input terminal of EXOR circuit 52 and to output terminal T16. Signal C inputted to output terminal T16 is inputted to input terminal T15 of another gate driver GD.

EXOR circuit 52 receives output signal C of comparator 50 at the first input terminal, and receives output signal C of comparator 50 of another gate driver GD at a second input terminal, via input terminal T15. EXOR circuit 52 calculates an exclusive logical sum of output signals C of two comparators 50, and outputs a signal E indicating a result of calculation. When values of output signals C of two comparators 50 do not match, that is, when the value of one signal C is H and the value of the other signal C is L, output signal E of EXOR circuit 52 is set to an H level. When the values of output signals C of two comparators 50 match, output signal E of EXOR circuit 52 is set to an L level.

Determination unit 54 determines whether or not terminal-to-terminal voltages V of two semiconductor switches SW match, based on output signal E of EXOR circuit 52. Determination unit 54 outputs signal DET indicating a result of determination to main controller 40, via output terminal T13. When determination unit 54 determines that terminal-to-terminal voltages V of two semiconductor switches SW match, determination unit 54 outputs signal DET at an L level. When determination unit 54 determines that terminal-to-terminal voltages V of two semiconductor switches SW do not match, determination unit 54 outputs signal DET at an H level.

Figure 5:
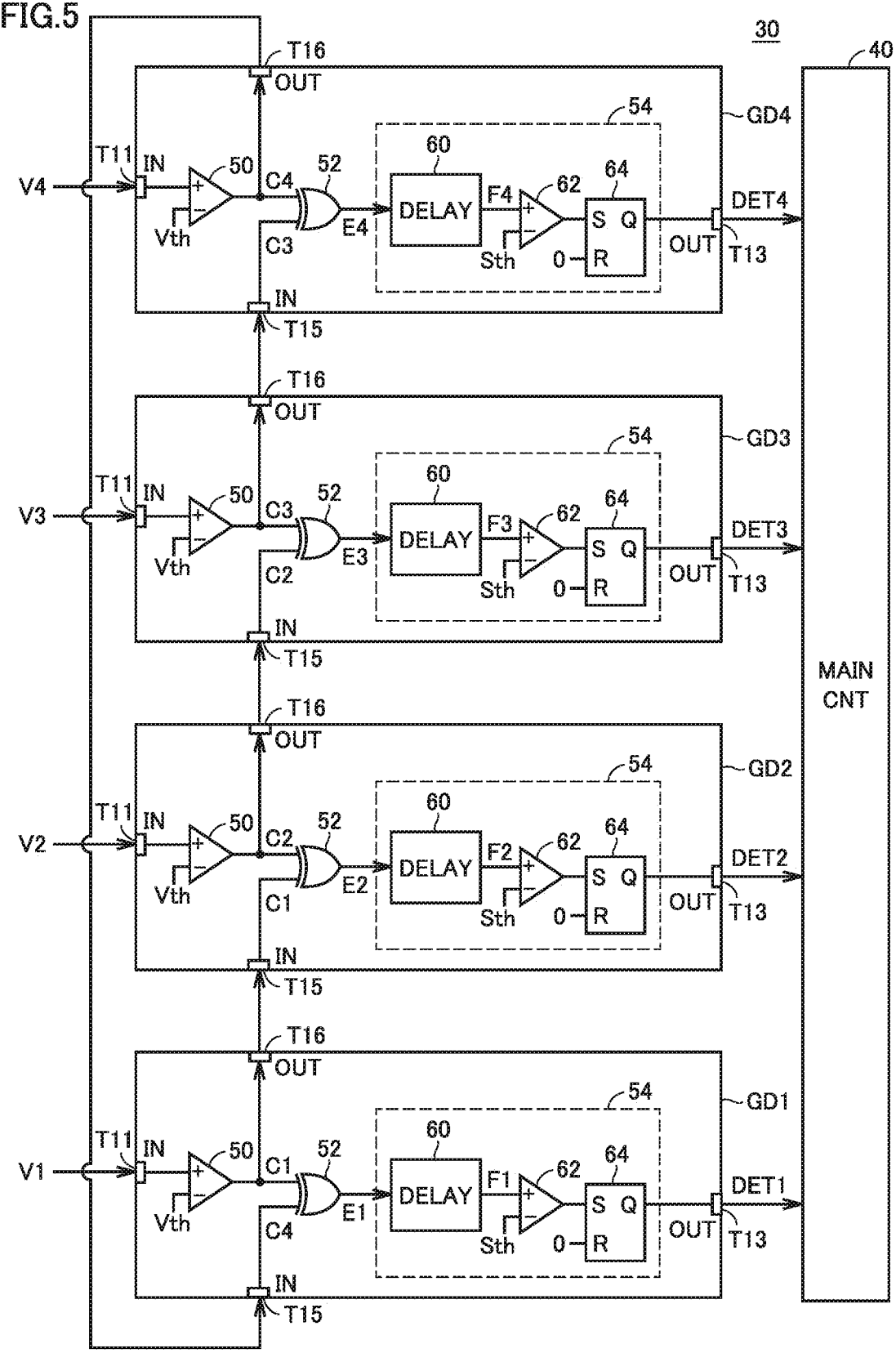
FIG. 5 is a circuit block diagram showing a first configuration example of determination units shown in FIG. 4.

FIG. 5 is a circuit block diagram showing a first configuration example of determination units 54 shown in FIG. 4. As shown in FIG. 5, each determination unit 54 has a delay circuit 60, a comparator 62, and a flip-flop 64.

Delay circuit 60 delays output signal E of EXOR circuit 52 by a predetermined time Td1 to generate a signal F. As delay circuit 60, for example, a low pass filter having a resistive element connected in series with an input terminal and a capacitor connected in parallel with the input terminal can be used. When signal E is at the L level, signal F is at an L level. When signal E rises from the L level to the H level, signal F is raised from the L level to an H level after a lapse of predetermined time Td1. When signal E falls from the H level to the L level, signal F is caused to fall from the H level to the L level after a lapse of predetermined time Td1. That is, delay circuit 60 delays a rising edge and a falling edge of signal E by predetermined time Td1 to generate signal F. A method for setting predetermined period Td1 will be described later.

Comparator 62 compares a value of output signal F of delay circuit 60 with a threshold value Sth, and outputs a signal indicating a result of comparison. Threshold value Sth has a value that is more than or equal to 0 and less than 1. When the value of signal F is larger than threshold value Sth, the output signal of comparator 62 has a value "1". When the value of signal F is smaller than threshold value Sth, the output signal of comparator 62 has a value "0". That is, comparator 62 outputs the value "1" when signal F is at the H level, and outputs the value "0" when signal F is at the L level.

Flip-flop 64 receives the output signal of comparator 62 at a set (S), and receives a value "0" at a reset (R). When S=1 and R=0, an output (Q) is set to "1". When S=0 and R=0, output (Q) maintains its state. That is, when signal F rises from the L level to the H level, flip-flop 64 holds the state of the output in a state of "1". The output of flip-flop 64 is provided to main controller 40 via output terminal T13, as signal DET.

Thus, in determination unit 54, when output signal E of EXOR circuit 52 rises from the L level to the H level, signal F is raised from the L level to the H level after a lapse of predetermined time Td1. When signal F is raised from the L level to the H level, the output signal of comparator 62 changes from an L level to an H level, and output signal DET of flip-flop 64 is set to an H level (DET=1).

However, when signal E falls to the L level before predetermined time Td1 has elapsed after the rising of output signal E of EXOR circuit 52 from the L level to the H level, signal F is not raised from the L level to the H level, and thus the output signal of comparator 62 does not change from the L level, and output signal DET of flip-flop 64 is set to an L level (DET=0).

That is, when output signal E of EXOR circuit 52 rises from the L level to the H level and maintains the state at the H level for predetermined time Td1 from the rising edge, output signal DET of determination unit 54 is set to the H level. On the other hand, when signal E does not maintain the state at the H level for predetermined time Td1 from the rising edge, output signal DET of determination unit 54 is set to the L level.

According to the configuration described above, when a state where output signals C of two comparators 50 do not match continues for predetermined time Td1, determination unit 54 determines that terminal-to-terminal voltages V of two semiconductor switches SW respectively corresponding to two output signals C do not match, and outputs signal DET at the H level. On the other hand, when the state where output signals C of two comparators 50 do not match does not continue for predetermined time Td1, determination unit 54 determines that terminal-to-terminal voltages V of two semiconductor switches SW respectively corresponding to two output signals C match, and outputs signal DET at the L level.

Next, operations of gate drivers GD will be described using FIGS. 4 and 5. Since the operations of gate drivers GD1 to GDn are basically the same, operation of gate driver GD2 will be representatively described.

In gate driver GD2, comparator 50 compares terminal-to-terminal voltage V2 of semiconductor switch SW2 with threshold voltage Vth, and outputs a signal C2 indicating a result of comparison to EXOR circuit 52 and output terminal T16. Input terminal T15 receives an output signal C1 of comparator 50 of gate driver GD1. EXOR circuit 52 calculates an exclusive logical sum of output signal C2 of comparator 50 and output signal C1 of comparator 50, and outputs a signal E2 indicating a result of calculation. When values of signal C1 and signal C2 match, signal E2 is set to the L level, and when the values of signal C1 and signal C2 do not match, signal E2 is set to the H level.

Determination unit 54 determines whether or not output signals C1 and C2 of two comparators 50 match, based on output signal E2 of EXOR circuit 52. When a state where signals C1 and C2 do not match continues for predetermined time Td1, determination unit 54 determines that terminal-to-terminal voltages V1 and V2 of semiconductor switches SW1 and SW2 respectively corresponding to signals C1 and C2 do not match, and outputs signal DET2 at the H level. On the other hand, when the state where signals C1 and C2 do not match does not continue for predetermined time Td1, determination unit 54 determines that terminal-to-terminal voltages V1 and V2 of semiconductor switches SW1 and SW2 respectively corresponding to signals C1 and C2 match, and outputs signal DET2 at the L level.

Gate driver GD3 outputs signal DET3 by performing the same operation as that of gate driver GD2 described above. A state where an output signal C3 of comparator 50 of gate driver GD3 and output signal C2 of comparator 50 of gate driver GD2 do not match continues for predetermined time Td1, determination unit 54 determines that terminal-to-terminal voltages V2 and V3 of semiconductor switches SW2 and SW3 respectively corresponding to signals C2 and C3 do not match, and outputs signal DET3 at the H level. When the state where signals C2 and C3 do not match does not continue for predetermined time Td1, determination unit 54 determines that terminal-to-terminal voltages V2 and V3 of semiconductor switches SW2 and SW3 respectively corresponding to signals C2 and C3 match, and outputs signal DET3 at the L level.

Gate driver GD4 outputs signal DET4 by performing the same operation as that of gate driver GD2 described above. A state where an output signal C4 of comparator 50 of gate driver GD4 and output signal C3 of comparator 50 of gate driver GD3 do not match continues for predetermined time Td1, determination unit 54 determines that terminal-to-terminal voltages V3 and V4 of semiconductor switches SW3 and SW4 respectively corresponding to signals C3 and C4 do not match, and outputs signal DET4 at the H level. When the state where signals C3 and C4 do not match does not continue for predetermined time Td1, determination unit 54 determines that terminal-to-terminal voltages V3 and V4 of semiconductor switches SW3 and SW4 respectively corresponding to signals C3 and C4 match, and outputs signal DET4 at the L level.

Gate driver GD1 outputs signal DET1 by performing the same operation as that of gate driver GD2 described above. A state where output signal C1 of comparator 50 of gate driver GD1 and output signal C4 of comparator 50 of gate driver GD4 do not match continues for predetermined time Td1, determination unit 54 determines that terminal-to-terminal voltages V1 and V4 of semiconductor switches SW1 and SW4 respectively corresponding to signals C1 and C4 do not match, and outputs signal DET1 at the H level. When the state where signals C1 and C4 do not match does not continue for predetermined time Td1, determination unit 54 determines that terminal-to-terminal voltages V1 and V4 of semiconductor switches SW1 and SW4 respectively corresponding to signals C1 and C4 match, and outputs signal DET1 at the L level.

Main controller 40 receives signals DET1 to DETn from gate drivers GD1 to GDn. Main controller 40 determines whether or not there occurs a cutoff abnormality in semiconductor switches SW1 to SWn, based on signals DET1 to DETn.

FIG. 6 is a view illustrating processing of determining a cutoff abnormality of semiconductor switches SW in main controller 40. FIG. 6 illustrates values of signals DET1 to DET4, and results of determination in main controller 40 based on the values.

A case 1 indicates a case where signals DET1 to DET4 are all at the L level. Signal DET1 at the L level indicates that terminal-to-terminal voltage V1 of semiconductor switch SW1 matches terminal-to-terminal voltage V4 of semiconductor switch SW4. Signal DET2 at the L level indicates that terminal-to-terminal voltage V1 of semiconductor switch SW1 matches terminal-to-terminal voltage V2 of semiconductor switch SW2. Signal DET3 at the L level indicates that terminal-to-terminal voltage V2 of semiconductor switch SW2 matches terminal-to-terminal voltage V3 of semiconductor switch SW3. Signal DET4 at the L level indicates that terminal-to-terminal voltage V3 of semiconductor switch SW3 matches terminal-to-terminal voltage V4 of semiconductor switch SW4.

That is, the fact that signals DET1 to DET4 are all at the L level means that terminal-to-terminal voltages V1 to V4 of semiconductor switches SW1 to SW4 match with one another. In this case, main controller 40 determines that states of semiconductor switches SW1 to SW4 match with one another, and semiconductor switches SW1 to SW4 are all turned off normally.

A case 2 indicates a case where signals DET1 and DET4 are at the H level and signals DET2 and DET3 are at the L level. Signal DET1 at the H level indicates that terminal-to-terminal voltage V1 of semiconductor switch SW1 does not match terminal-to-terminal voltage V4 of semiconductor switch SW4. Signal DET2 at the L level indicates that terminal-to-terminal voltage V1 of semiconductor switch SW1 matches terminal-to-terminal voltage V2 of semiconductor switch SW2. Signal DET3 at the L level indicates that terminal-to-terminal voltage V2 of semiconductor switch SW2 matches terminal-to-terminal voltage V3 of semiconductor switch SW3. Signal DET4 at the H level indicates that terminal-to-terminal voltage V3 of semiconductor switch SW3 does not match terminal-to-terminal voltage V4 of semiconductor switch SW4.

Unlike in case 1 described above, in case 2, terminal-to-terminal voltages V1 to V4 of semiconductor switches SW1 to SW4 do not match. However, terminal-to-terminal voltages V1 to V3 of semiconductor switches SW1 to SW3 match with one another. Therefore, main controller 40 determines that the states of semiconductor switches SW1 to SW3 match with one another, but the state of semiconductor switch SW4 does not match the states of semiconductor switches SW1 to SW3. In this case, main controller 40 determines that a cutoff abnormality occurs in semiconductor switch SW4. Thus, when a cutoff abnormality occurs in any one semiconductor switch SW of semiconductor switches SW1 to SW4, two of signals DET1 to DET4 are at the H level. Therefore, main controller 40 can detect a cutoff abnormality of semiconductor switch SW, based on signals DET1 to DET4.

A case 3 indicates a case where signal DET1 is at the H level and signals DET2, DET3, and DET4 are at the L level. Signal DET1 at the H level indicates that terminal-to-terminal voltage V1 of semiconductor switch SW1 does not match terminal-to-terminal voltage V4 of semiconductor switch SW4. Signal DET2 at the L level indicates that terminal-to-terminal voltage V1 of semiconductor switch SW1 matches terminal-to-terminal voltage V2 of semiconductor switch SW2. Signal DET3 at the L level indicates that terminal-to-terminal voltage V2 of semiconductor switch SW2 matches terminal-to-terminal voltage V3 of semiconductor switch SW3. Signal DET4 at the L level indicates that terminal-to-terminal voltage V3 of semiconductor switch SW3 matches terminal-to-terminal voltage V4 of semiconductor switch SW4.

In case 3, one of signals DET1 to DET4 is at the H level, and the remaining three signals are at the L level. As described in case 2, when a cutoff abnormality occurs in one of semiconductor switches SW1 to SW4, two of signals DET1 to DET4 are at the H level. Therefore, in case 3, main controller 40 determines that either one of the values of signals DET1 and DET2 is not correct. In this case, main controller 40 determines that a failure occurs in an internal circuit in gate driver GD1 or GD2.

Next, an effect exhibited by power supply device 10 in accordance with the first embodiment will be described.

In power supply device 10 in accordance with the first embodiment, when AC power supply 1 is abnormal (when a power failure or an instantaneous voltage drop occurs in AC power supply 1), control signal S0 at the L level is provided to mechanical switch 12, and gate signals G1 to Gn at the L level are provided to semiconductor switches SW1 to SWn, respectively, of switch circuit 14. Mechanical switch 12 and semiconductor switches SW1 to SWn are turned off instantaneously, and the DC power in battery 3 is converted into AC power by bidirectional converter 16 and the AC power is supplied to load 2. It should be noted that semiconductor switches SW1 to SWn are turned off several microseconds after a time point at which control signal S0 at the L level and gate signals G1 to Gn at the L level are provided, and mechanical switch 12 is turned off several tens of milliseconds after the time point.

When semiconductor switch SW is turned off normally, terminal-to-terminal voltage V of semiconductor switch SW is set to a voltage according to the voltage difference between AC voltage VI and AC voltage VO. When a cutoff abnormality occurs in semiconductor switch SW, semiconductor switch SW is not turned off normally, and terminal-to-terminal voltage V is set to the zero voltage. Therefore, it is possible to determine whether or not semiconductor switch SW is turned off normally, based on the magnitude of terminal-to-terminal voltage V detected by voltage detector 15.

However, in power supply device 10 in accordance with the first embodiment, mechanical switch 12 and switch circuit 14 are connected in series between input terminal T1 and output terminal T2. Thus, when both mechanical switch 12 and semiconductor switches SW1 to SWn of switch circuit 14 are turned off, most of the voltage difference between AC voltage VI and AC voltage VO is applied to between terminals of mechanical switch 12. This is because an off resistance (a resistance when the switch is turned off) of mechanical switch 12 is sufficiently larger than an off resistance of each semiconductor switch. Therefore, terminal-to-terminal voltage V of semiconductor switch SW that is turned off normally is set to a value close to the zero voltage, and is less likely to exhibit a significant difference from terminal-to-terminal voltage V of semiconductor switch SW having a cutoff abnormality. As a result, it becomes difficult to detect occurrence of a cutoff abnormality based on the magnitude of the detection value of terminal-to-terminal voltage V.

As described above, in the first embodiment, control device 30 is configured to detect a cutoff abnormality of semiconductor switches SW1 to SWn by determining whether or not terminal-to-terminal voltages V match with one another among the plurality of semiconductor switches SW1 to SWn. Specifically, when terminal-to-terminal voltages V do not match with one another among semiconductor switches SW1 to SWn, control device 30 detects a cutoff abnormality of semiconductor switches SW1 to SWn. Thereby, even when terminal-to-terminal voltage V of semiconductor switch SW that is turned off normally is set to a value close to the zero voltage, it is possible to detect occurrence of a cutoff abnormality in semiconductor switches SW1 to SWn.

Figure 7:
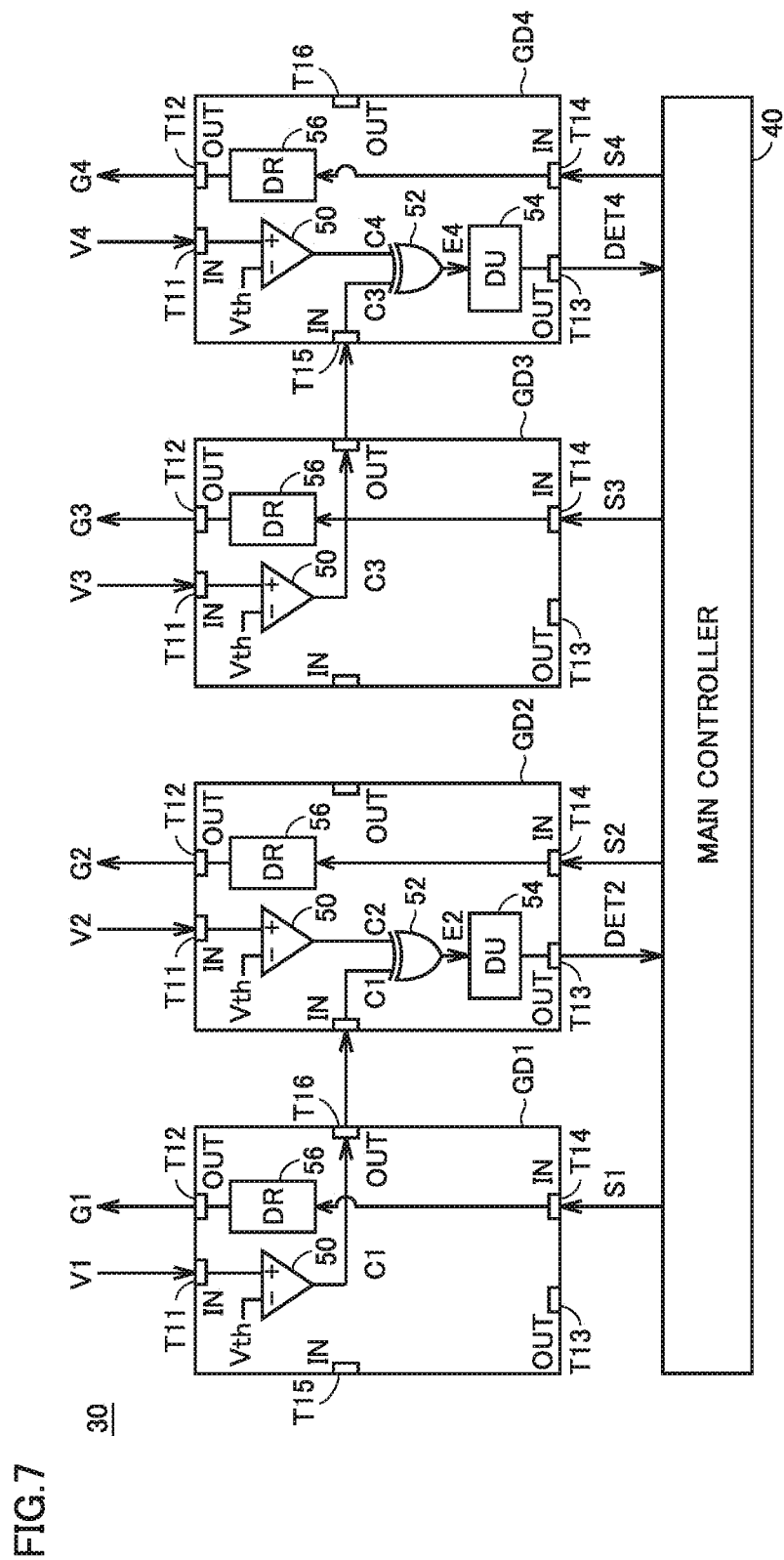
FIG. 7 is a circuit block diagram showing a reference example of the determination units shown in FIG. 4.

It should be noted that, as a technique for determining whether or not terminal-to-terminal voltages V of two semiconductor switches SW match, it is possible to adopt a configuration as in a reference example shown in FIG. 7, in which gate driver GD2 determines whether or not terminal-to-terminal voltages V1 and V2 of semiconductor switches SW1 and SW2 match, based on output signal C2 of comparator 50 and output signal C1 of comparator 50 provided from gate driver GD1, and gate driver GD4 determines whether or not terminal-to-terminal voltages V3 and V4 of semiconductor switches SW3 and SW4 match, based on output signal C4 of comparator 50 and output signal C3 of comparator 50 provided from gate driver GD3. Also in the reference example of FIG. 7, main controller 40 can detect a cutoff abnormality of semiconductor switches SW1 to SW4 based on signals DET2 and DET4.

However, in the reference example shown in FIG. 7, when gate driver GD2 or GD4 has a failure, signal DET2 or DET4 indicates an erroneous value, and thereby it may be impossible to accurately detect a cutoff abnormality of semiconductor switches SW1 to SW4.

In contrast, in the first embodiment, control device 30 is configured such that two gate drivers GD determine whether or not terminal-to-terminal voltage V of one semiconductor switch SW matches another terminal-to-terminal voltage V. Accordingly, when a cutoff abnormality occurs in one semiconductor switch SW, two gate drivers GD determine that terminal-to-terminal voltage V does not match another terminal-to-terminal voltage V, as shown in case 2 of FIG. 6. Therefore, it is possible to prevent erroneous detection of a cutoff abnormality of semiconductor switches SW1 to SWn due to a failure in one gate driver GD.

It should be noted that, as described above, in each gate driver GD, determination unit 54 is configured such that, when a state where output signal C of comparator 50 thereof and output signal C of comparator 50 of another gate driver GD do not match continues for predetermined time Td1, determination unit 54 determines that terminal-to-terminal voltages V of two corresponding semiconductor switches SW do not match. In the following, a method for setting predetermined time Td1 in determination unit 54 will be described using FIG. 8.

Figure 8:
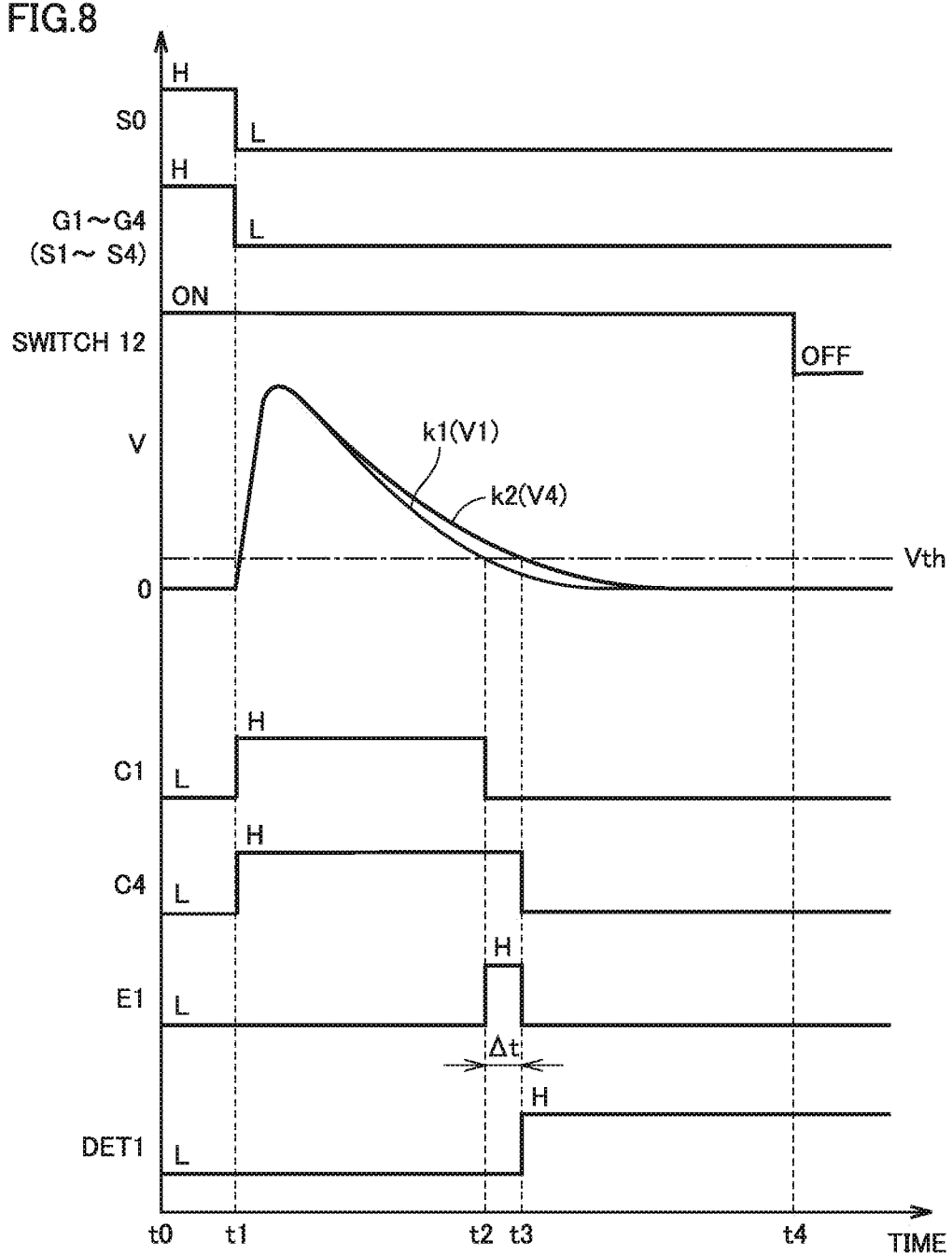
FIG. 8 is a timing chart showing operation of a gate driver.

FIG. 8 is a timing chart showing operation of gate driver GD1.

FIG. 8 shows waveforms of control signal S0 and gate signals G1 to G4 (control signals S1 to S4), a waveform indicating a state of mechanical switch 12, and waveforms of terminal-to-terminal voltages V of semiconductor switches SW. FIG. 8 further shows waveforms of output signal C1 of comparator 50 of gate driver GD1 and output signal C4 of comparator 50 of gate driver GD4, and waveforms of output signal E1 of EXOR circuit 52 and output signal DET1 of determination unit 54 of gate driver GD1.

As shown in FIG. 8, at a time t0, both mechanical switch 12 and semiconductor switches SW are in the ON state. When an abnormality occurs in AC power supply 1, control device 30 provides control signal S0 at the L level to mechanical switch 12, and provides gate signals G at the L level to semiconductor switches SW (a time t1).

When control signal S0 and gate signals G fall from the H level to the L level at time t1, mechanical switch 12 and semiconductor switches SW are turned off. It should be noted that mechanical switch 12 is turned off at timing (a time t4) delayed from timing at which semiconductor switches SW are turned off.

When semiconductor switches SW are suddenly turned off in a state where a current is flowing at time t1, a surge voltage is generated between terminals of each semiconductor switch SW. Subsequently, terminal-to-terminal voltage V decreases gradually by discharging a charge stored in the capacitor included in snubber circuit SN. It should be noted that, when mechanical switch 12 is turned off at time t4, terminal-to-terminal voltage V is set to a value close to the zero voltage. In FIG. 8, a waveform k1 represents a temporal change in terminal-to-terminal voltage V1 of semiconductor switch SW1, and a waveform k2 represents a temporal change in terminal-to-terminal voltage V4 of semiconductor switch SW4.

Although both semiconductor switches SW1 and SW4 are turned off normally, two waveforms k1 and k2 do not match completely. This is mainly because of a difference between the discharge rates of the capacitors in semiconductor switches SW1 and SW4, due to variation in the capacities of the capacitors included in snubber circuits SN.

In each gate driver GD, output signal C of comparator 50 changes from the H level to the L level when terminal-to-terminal voltage V of corresponding semiconductor switch SW becomes lower than threshold voltage Vth. In the example of FIG. 8, since terminal-to-terminal voltage V1 of semiconductor switch SW1 and terminal-to-terminal voltage V4 of semiconductor switch SW4 have different waveforms, output signal C1 of comparator 50 within gate driver GD1 and output signal C4 of comparator 50 within gate driver GD4 change from the H level to the L level at timings different from each other. Specifically, signal C1 changes from the H level to the L level at a time t2, and signal C4 changes from the H level to the L level at a time t3 later than time t2. Δt in the drawing indicates a time difference between time t2 and time t3.

In gate driver GD1, EXOR circuit 52 outputs signal E1 at the L level when the values of signals C1 and C4 match, and outputs signal E1 at the H level when the values of signals C1 and C4 do not match. In the example of FIG. 8, signal E1 is set to the H level in time Δt for which signals C1 and C4 do not match.

Determination unit 54 determines whether or not terminal-to-terminal voltages V1 and V4 of two semiconductor switches SW1 and SW4 match, based on output signal E1 of EXOR circuit 52, and outputs signal DET1 indicating a result of determination to main controller 40. When signal E1 maintains the H level for predetermined Td1, determination unit 54 determines that terminal-to-terminal voltages V1 and V4 of semiconductor switches SW1 and SW4 do not match, and outputs signal DET1 at the H level.

Here, if predetermined time Td1 is shorter than time Δt (Td1<Δt), determination unit 54 outputs signal DET1 at the H level at time t3, as shown in FIG. 8. As a result, main controller 40, upon reception of signal DET1 at the H level, determines that a cutoff abnormality occurs in either of semiconductor switches SW1 and SW4, although semiconductor switches SW1 and SW4 are turned off normally. In order to prevent such an erroneous determination, it is necessary to set predetermined time Td1 to a time sufficiently longer than time difference Δt.

Second Embodiment

A second embodiment will describe a second configuration example of determination units 54 within gate drivers GD.

Figure 9:
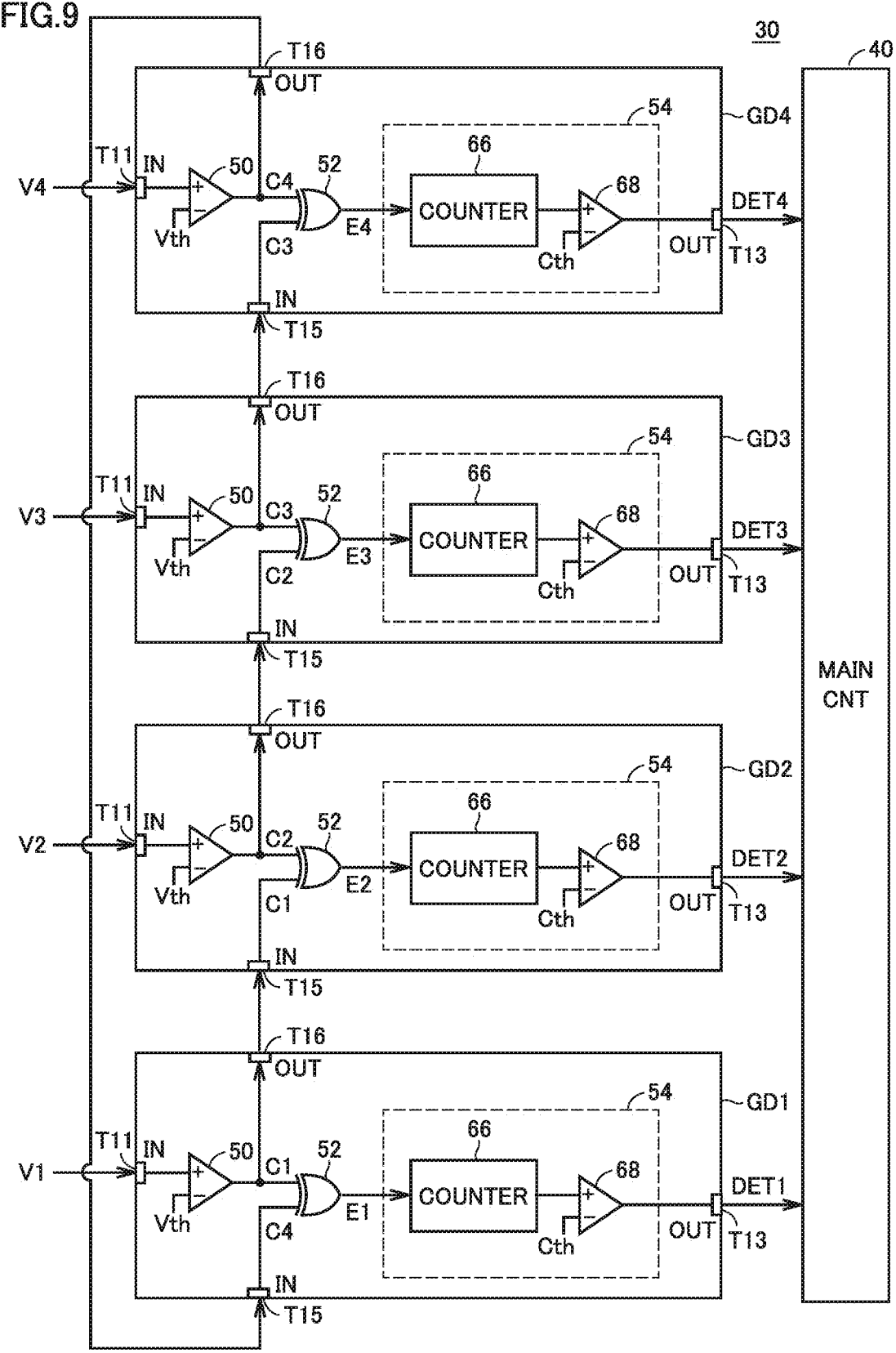
FIG. 9 is a circuit block diagram showing a second configuration example of the determination units shown in FIG. 4.

FIG. 9 is a circuit block diagram showing a second configuration example of determination units 54 shown in FIG. 4. As shown in FIG. 9, each determination unit 54 has a counter 66 and a comparator 68.

Counter 66 counts the number of times that output signal E of EXOR circuit 52 is set to the H level, and outputs a signal indicating a count value. Counter 66 increments the count value by 1 each time output signal E of EXOR circuit 52 maintains the H level for the prescribed predetermined time.

Comparator 68 compares the count value of counter 66 with a threshold value Cth, and outputs a signal indicating a result of comparison. Threshold value Cth is an integer more than or equal to 2. When the count value is larger than threshold value Cth, the output signal of comparator 68 is set to an H level. When the count value is smaller than threshold value Cth, the output signal of comparator 68 is set to an L level. The output of comparator 68 is provided to main controller 40 via output terminal T13, as signal DET.

Thus, in determination unit 54, when the number of times that output signal E of EXOR circuit 52 is set to the H level exceeds threshold value Cth, the output signal of comparator 68 changes from the L level to the H level, and output signal DET is set to the H level. On the other hand, when the number of times that output signal E of EXOR circuit 52 is set to the H level is less than threshold value Cth, the output signal of comparator 68 does not change from the L level, and output signal DET is set to the L level.

According to the configuration described above, when the number of times that output signals C of two comparators 50 do not match exceeds threshold value Cth, determination unit 54 determines that terminal-to-terminal voltages V of two semiconductor switches SW respectively corresponding to two output signals C do not match, and outputs signal DET at the H level. On the other hand, when the number of times that output signals C of two comparators 50 do not match is less than threshold value Cth, determination unit 54 determines that terminal-to-terminal voltages V of two semiconductor switches SW respectively corresponding to two output signals C match, and outputs signal DET at the L level.

Next, operations of gate drivers GD shown in FIG. 9 will be described using FIG. 10. Since the operations of gate drivers GD1 to GDn are basically the same, operation of gate driver GD1 will be representatively described.

Figure 10:
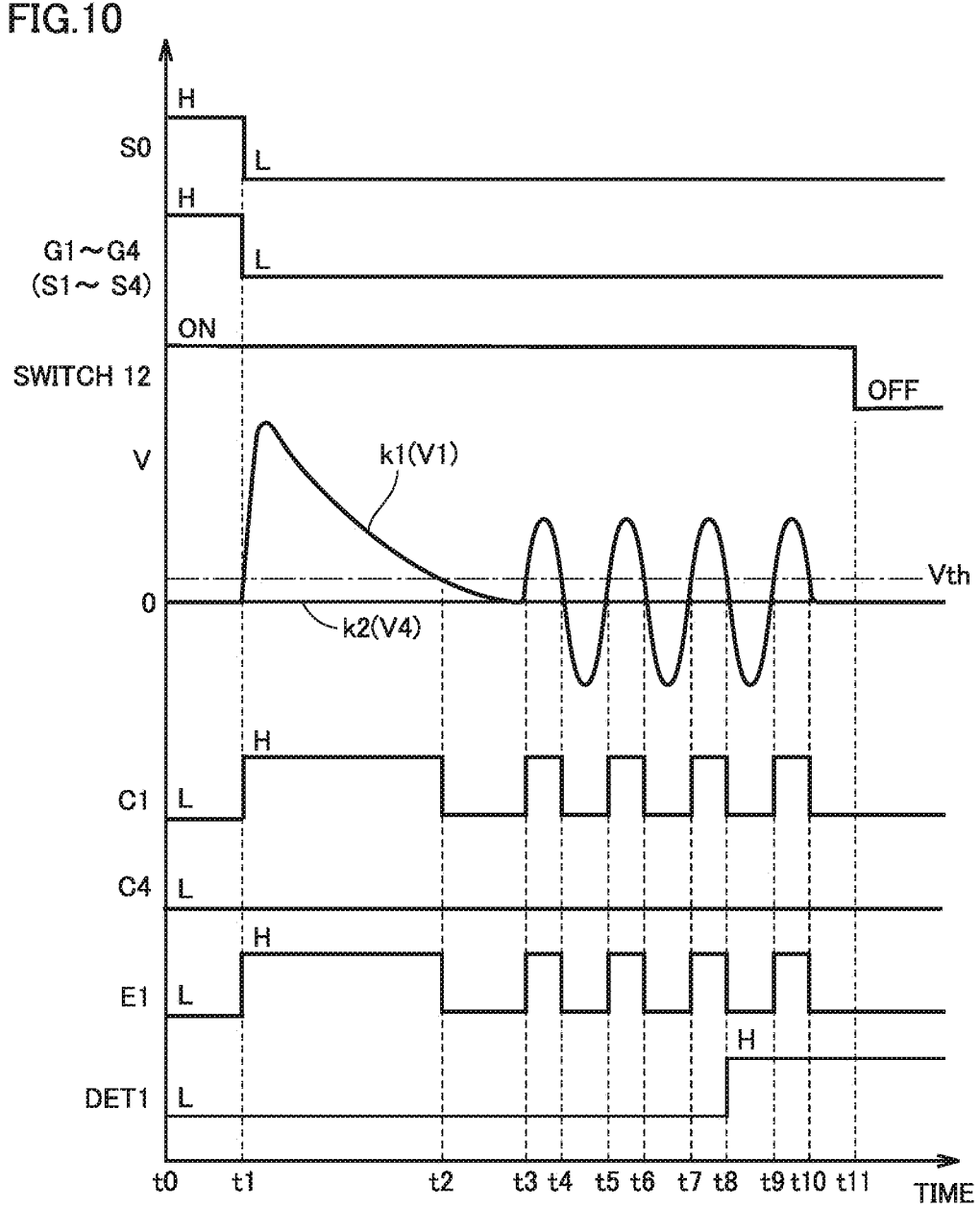
FIG. 10 is a timing chart showing operation of the gate driver.

FIG. 10 is a timing chart showing operation of gate driver GD1.

FIG. 10 shows waveforms of control signal S0 and gate signals G1 to G4 (control signals S1 to S4), a waveform indicating the state of mechanical switch 12, and waveforms of terminal-to-terminal voltages V of semiconductor switches SW. FIG. 10 further shows waveforms of output signal C1 of comparator 50 of gate driver GD1 and output signal C4 of comparator 50 of gate driver GD4, and waveforms of output signal E1 of EXOR circuit 52 and output signal DET1 of determination unit 54 of gate driver GD1.

As shown in FIG. 10, at time t0, both mechanical switch 12 and semiconductor switches SW are in the ON state. When an abnormality occurs in AC power supply 1, control device 30 provides control signal S0 at the L level to mechanical switch 12, and provides gate signals G at the L level to semiconductor switches SW. When control signal S0 and gate signals G fall from the H level to the L level at time t1, mechanical switch 12 and semiconductor switches SW are turned off. It should be noted that mechanical switch 12 is turned off at timing (a time t11) delayed from timing at which semiconductor switches SW are turned off.

When semiconductor switches SW are suddenly turned off in the state where a current is flowing at time t1, a surge voltage is generated between the terminals of each semiconductor switch SW. Subsequently, terminal-to-terminal voltage V decreases gradually by discharging a charge stored in the capacitor included in snubber circuit SN.

It should be noted that, at and after time t1, control device 30 controls bidirectional converter 16 such that AC voltage VO is set to reference voltage VOr, based on the detection value of voltage detector 20. Since AC voltage VO is a sinusoidal wave, the voltage difference between AC voltage VI and AC voltage VO is also a sinusoidal wave. Accordingly, terminal-to-terminal voltage V of semiconductor switch SW is also a sinusoidal wave. However, when mechanical switch 12 is turned off at time t11, terminal-to-terminal voltage V is set to a value close to the zero voltage.

In FIG. 10, waveform k1 represents a temporal change in terminal-to-terminal voltage V1 of semiconductor switch SW1, and waveform k2 represents a temporal change in terminal-to-terminal voltage V4 of semiconductor switch SW4. Unlike in FIG. 8, in FIG. 10, it is assumed that semiconductor switch SW1 is turned off normally, whereas semiconductor switch SW4 is not turned off normally and maintains the ON state.

At and after time t1, output signal C1 of comparator 50 within gate driver GD1 shifts between the H level and the L level, according to changes in terminal-to-terminal voltage V1. Specifically, signal C1 is set to the H level when terminal-to-terminal voltage V1 is larger than threshold voltage Vth, and is set to the L level when terminal-to-terminal voltage V1 is smaller than threshold voltage Vth. On the other hand, output signal C4 of comparator 50 within gate driver GD4 remains at the L level at and after time t1.

In gate driver GD1, EXOR circuit 52 outputs signal E1 at the L level when the values of signals C1 and C4 match, and outputs signal E1 at the H level when the values of signals C1 and C4 do not match.

Determination unit 54 determines whether or not terminal-to-terminal voltages V1 and V4 of two semiconductor switches SW1 and SW4 match, based on output signal E1 of EXOR circuit 52, and outputs signal DET1 indicating a result of determination to main controller 40. Determination unit 54 counts the number of times that signal E1 is set to the H level, and when the count value exceeds threshold value Cth (a time t8), determination unit 54 determines that terminal-to-terminal voltages V1 and V4 of semiconductor switches SW1 and SW4 do not match, and outputs signal DET1 at the H level. In FIG. 10, threshold value Cth is set to 4.

Main controller 40 receives signals DET1 to DETn from gate drivers GD1 to GDn. Main controller 40 determines whether or not a cutoff abnormality occurs in semiconductor switches SW1 to SWn, based on signals DET1 to DETn.

As described above, in power supply device 10 in accordance with the second embodiment, when the number of times that output signal E1 of EXOR circuit 52 is set to the H level exceeds threshold value Cth (Cth≥2), determination unit 54 determines that terminal-to-terminal voltages V1 and V4 of semiconductor switches SW1 and SW4 do not match, and outputs signal DET1 at the H level. Thereby, when signal E1 is temporarily set to the H level for time difference At due to variation in the waveforms of terminal-to-terminal voltages V as described in FIG. 8, the count value is incremented by 1. However, since the count value is less than threshold value Cth, signal DET1 remains at the L level. That is, signal DET1 is not influenced by the variation in the waveforms of terminal-to-terminal voltages V. Therefore, it is possible to prevent main controller 40 from erroneously determining that a cutoff abnormality occurs in either of semiconductor switches SW1 and SW4.

Third Embodiment

A third embodiment will describe a third configuration example of determination units 54 within gate drivers GD.

Figure 11:
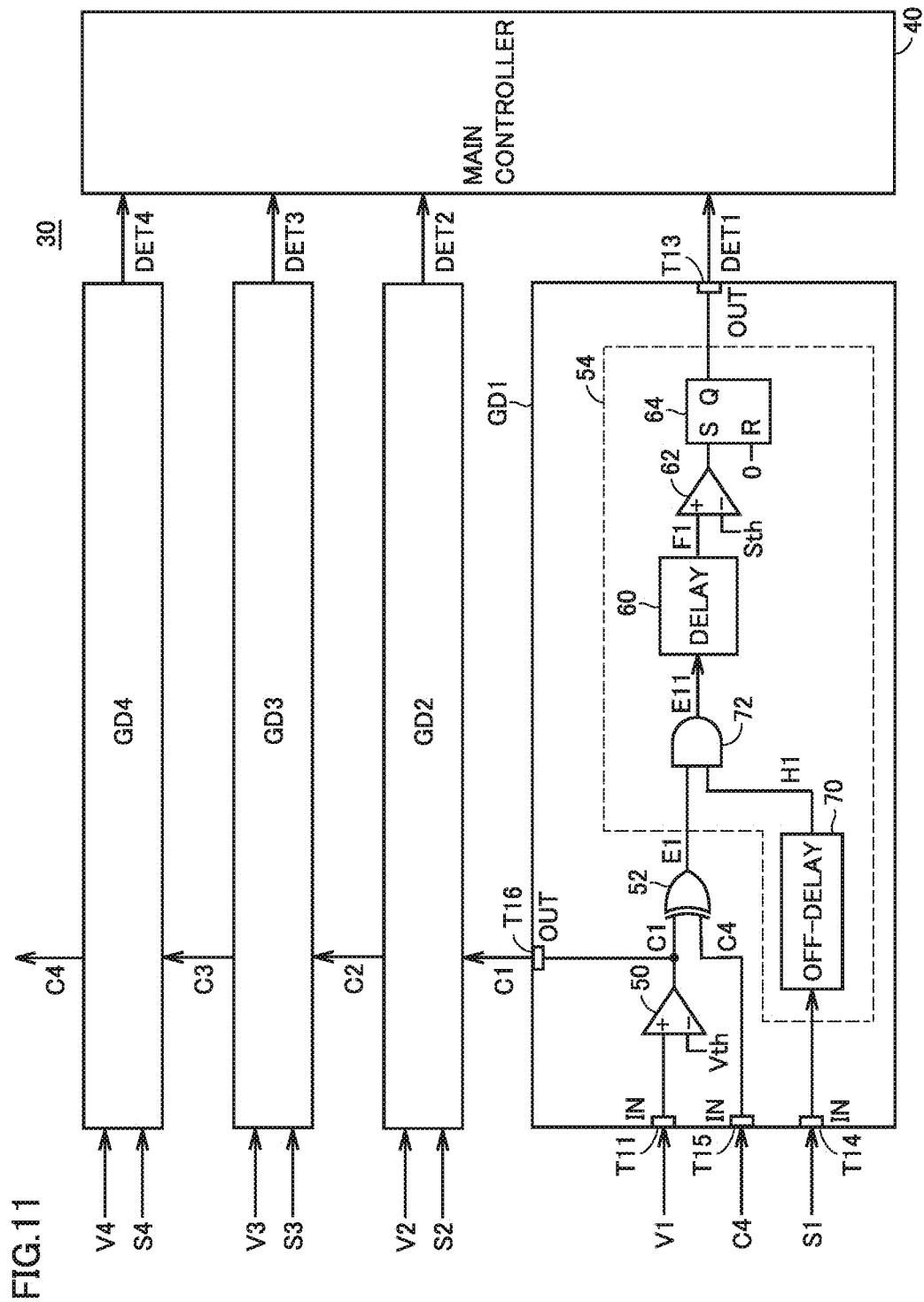
FIG. 11 is a circuit block diagram showing a third configuration example of the determination units shown in FIG. 4.

FIG. 11 is a circuit block diagram showing a third configuration example of determination units 54 shown in FIG. 4. It should be noted that, since determination units 54 of gate drivers GD1 to GDn have the same configuration, FIG. 11 representatively shows determination unit 54 of gate driver GD1.

As shown in FIG. 11, determination unit 54 has delay circuit 60, comparator 62, flip-flop 64, an off-delay circuit 70, and an AND (logical multiplication) circuit 72. Determination unit 54 shown in FIG. 11 is obtained by adding off-delay circuit 70 and AND circuit 72 to determination unit 54 shown in FIG. 5.

Off-delay circuit 70 receives control signal S1 via input terminal T14. Off-delay circuit 70 is a delay circuit for generating determination timing in determination unit 54 from control signal S1. When control signal S1 is raised from the L level to the H level, off-delay circuit 70 immediately raises an output signal H1 from an L level to an H level. On the other hand, when control signal S1 is caused to fall from the H level to the L level, off-delay circuit 70 causes output signal H1 to fall from the H level to the L level after a lapse of a predetermined delay time Td2. Output signal H1 of off-delay circuit 70 is inputted to a first input terminal of AND circuit 72. Delay time Td2 corresponds to a "first time".

AND circuit 72 receives output signal H1 of off-delay circuit 70 at the first input terminal, and receives output signal E1 of EXOR circuit 52 at a second input terminal. AND circuit 72 calculates a logical multiplication of signal H1 and signal E1, and outputs a signal E11 indicating a result of calculation. When signal H1 is at the H level, AND circuit 72 outputs signal E1 as it is. That is, E1 is equal to E11. On the other hand, when signal H1 is at the L level, AND circuit 72 outputs the signal at the L level. Thereby, in a period in which output signal H1 of off-delay circuit 70 is set to the H level, determination unit 54 determines whether or not terminal-to-terminal voltages V1 and V4 of semiconductor switches SW1 and SW4 match, based on output signal E1 of EXOR circuit 52.

Delay circuit 60 delays output signal E11 of AND circuit 72 by predetermined time Td1 to generate a signal F1. Predetermined time Td1 corresponds to a "second time". Predetermined time Td1 is set to be shorter than delay time Td2.

Comparator 62 compares a value of output signal F1 of delay circuit 60 with threshold value Sth, and outputs a signal indicating a result of comparison. Comparator 62 outputs a value "1" when signal F1 is at the H level, and outputs a value "0" when signal F1 is at the L level.

Flip-flop 64 receives the output signal of comparator 62 at set (S), and receives a value "0" at reset (R). The output of flip-flop 64 is provided to main controller 40 via output terminal T13, as signal DET1.

According to the configuration described above, when output signal E1 of EXOR circuit 52 maintains the state at the H level for predetermined time Td1 from the rising edge in the period in which output signal H1 of off-delay circuit 70 is set to the H level, output signal DET1 of determination unit 54 is set to the H level. On the other hand, when signal E1 does not maintain the state at the H level for predetermined time Td1 from the rising edge in that period, signal DET1 is set to the L level. Further, also in a period in which output signal H1 of off-delay circuit 70 is set to the L level, signal DET1 is set to the L level.

With such a configuration, when a state where output signals C1 and C4 of comparators 50 do not match continues for predetermined time Td1 in the period in which output signal H1 of off-delay circuit 70 is set to the H level, determination unit 54 determines that terminal-to-terminal voltages V1 and V4 of semiconductor switches SW1 and SW4 do not match, and outputs signal DET1 at the H level.

On the other hand, when the state where output signals C1 and C4 of comparators 50 do not match does not continue for predetermined time Td1, or in the period in which output signal H1 of off-delay circuit 70 is set to the L level, determination unit 54 outputs signal DET1 at the L level.

Next, operations of gate drivers GD shown in FIG. 11 will be described using FIG. 12. Since the operations of gate drivers GD1 to GDn are basically the same, operation of gate driver GD1 will be representatively described.

FIG. 12 is a timing chart showing operation of gate driver GD1.

FIG. 12 shows waveforms of control signal S0 and gate signals G1 to G4 (control signals S1 to S4), a waveform indicating the state of mechanical switch 12, and waveforms of terminal-to-terminal voltages V of semiconductor switches SW. FIG. 12 further shows waveforms of output signal C1 of comparator 50 of gate driver GD1 and output signal C4 of comparator 50 of gate driver GD4, and waveforms of output signal E1 of EXOR circuit 52, output signal H1 of off-delay circuit 70, output signal E11 of AND circuit 72, and output signal DET1 of determination unit 54 of gate driver GD1.

As shown in FIG. 12, at time t0, both mechanical switch 12 and semiconductor switches SW are in the ON state. When an abnormality occurs in AC power supply 1, control device 30 provides control signal S0 at the L level to mechanical switch 12, and provides gate signals G at the L level to semiconductor switches SW. When control signal S0 and gate signals G fall from the H level to the L level at time t1, mechanical switch 12 and semiconductor switches SW are turned off. It should be noted that mechanical switch 12 is turned off at timing (a time t6) delayed from timing at which semiconductor switches SW are turned off.

When semiconductor switches SW are suddenly turned off in the state where a current is flowing at time t1, a surge voltage is generated between the terminals of each semiconductor switch SW. Subsequently, terminal-to-terminal voltage V decreases gradually by discharging a charge stored in the capacitor included in snubber circuit SN. A period from time t3 to a time t5 corresponds to a discharge period of the capacitor. When mechanical switch 12 is turned off at time t6, terminal-to-terminal voltage V is set to a value close to the zero voltage.

In FIG. 12, waveform k1 represents a temporal change in terminal-to-terminal voltage V1 of semiconductor switch SW1, and waveform k2 represents a temporal change in terminal-to-terminal voltage V4 of semiconductor switch SW4. Unlike in FIG. 8, in FIG. 12, it is assumed that semiconductor switch SW1 is turned off normally, whereas semiconductor switch SW4 is not turned off normally and maintains the ON state.

At and after time t1, output signal C1 of comparator 50 within gate driver GD1 shifts between the H level and the L level, according to changes in terminal-to-terminal voltage V1. Specifically, signal C1 is set to the H level when terminal-to-terminal voltage V1 is larger than threshold voltage Vth, and is set to the L level when terminal-to-terminal voltage V1 is smaller than threshold voltage Vth. On the other hand, output signal C4 of comparator 50 within gate driver GD4 remains at the L level at and after time t1.

In gate driver GD1, EXOR circuit 52 outputs signal E1 at the L level when the 5 values of signals C1 and C4 match, and outputs signal E1 at the H level when the values of signals C1 and C4 do not match. In the example of FIG. 12, signal E1 is set to the H level in a period from time t1 to time t4.

In determination unit 54, output signal H1 of off-delay circuit 70 is caused to fall to the L level after delay time Td2 has elapsed (time t2) after the falling of control signal S1 to the L level (time t1). AND circuit 72 calculates the logical multiplication of signal E1 and signal H1, and outputs signal E11 indicating a result of calculation. Signal E11 has the same value as that of signal E1 when signal H1 is at the H level, and is fixed to an L level when signal H1 is at the L level. In FIG. 12, signal E11 is set to an H level in a period from time t1 to time t2 (corresponding to delay time Td2).

Determination unit 54 determines whether or not terminal-to-terminal voltages V1 and V4 of two semiconductor switches SW1 and SW4 match, based on output signal E11 of AND circuit 72, and outputs signal DET1 indicating a result of determination to main controller 40. When signal E11 maintains the H level for predetermined Td1, determination unit 54 determines that terminal-to-terminal voltages V1 and V4 of semiconductor switches SW1 and SW4 do not match, and outputs signal DET1 at the H level.

Main controller 40 receives signals DET1 to DETn from gate drivers GD1 to GDn. Main controller 40 determines whether or not a cutoff abnormality occurs in semiconductor switches SW1 to SWn, based on signals DET1 to DETn.

As described above, in power supply device 10 in accordance with the third embodiment, determination unit 54 is configured to determine whether or not terminal-to-terminal voltages V1 and V4 of semiconductor switches SW1 and SW4 match, in the period from when control signal S1 (gate signal G1) is caused to fall to the L level (time t1) to when delay time Td2 has elapsed (time t2). That is, delay time Td2 corresponds to the determination timing in determination unit 54.

In the above configuration, delay time Td2 is set so as not to include the discharge period of the capacitor in snubber circuit SN (the period from time t3 to time t5 in the drawing). Thereby, even when signal E1 is temporarily set to the H level due to the variation in the waveforms of terminal-to-terminal voltages V in the discharge period of the capacitor as described in FIG. 8, signal DET1 remains at the L level, because the determination timing in determination unit 54 is already finished. Therefore, it is possible to prevent main controller 40 from erroneously determining that a cutoff abnormality occurs in either of semiconductor switches SW1 and SW4.

It should be noted that, in the third embodiment, predetermined time Td1 in determination unit 54 is set to a time that is shorter than delay time Td2. Since it is not necessary to set predetermined time Td1 in consideration of the variation in the capacities of the capacitors in snubber circuits SN as in the first embodiment, predetermined time Td1 in the third embodiment can be set to a time that is sufficiently shorter than predetermined time Td1 in the first embodiment. As a result, it is possible to detect a cutoff abnormality of semiconductor switches SW1 to SWn in a short time after control signals S are caused to fall to the L level.

It should be understood that the embodiments disclosed herein are illustrative and non-restrictive in every respect. The scope of the present disclosure is defined by the scope of the claims, rather than the description above, and is intended to include any modifications within the scope and meaning equivalent to the scope of the claims.

REFERENCE SIGNS LIST

1: AC power supply; 2: load; 3: battery; 10: power supply device; 12: mechanical switch; 14: switch circuit; 16: bidirectional converter; 15, 18, 20: voltage detector; 30: control device; 40: main controller; 50, 62, 68: comparator; 52: EXOR circuit; 54: determination unit; 56: driver; 60: delay circuit; 64: flip-flop; 66: counter; 70: off-delay circuit; 72: AND circuit; SW1 to SWn, SW: semiconductor switch; Q1 to Qn, QA, QB: IGBT; D1 to Dn, DA, DB: diode; SN1 to SNn, SN: snubber circuit; Z1 to Zn, Z: varistor; T1, T11, T14, T15: input terminal; T2, T12, T13, T16: output terminal; T3: DC terminal.

The invention claimed is:

1. A power supply device comprising:
a first terminal that receives an AC voltage supplied from an AC power supply;
a second terminal connected to a load;
a plurality of semiconductor switches connected in series between the first terminal and the second terminal;
a mechanical switch connected in series with the plurality of semiconductor switches, between the first terminal and the second terminal;
a plurality of voltage detectors that are provided corresponding to the plurality of semiconductor switches, respectively, and detect terminal-to-terminal voltages of the corresponding semiconductor switches; and
a control device, wherein
the control device includes
a main controller that controls turning on/off of the plurality of semiconductor switches and the mechanical switch based on the AC voltage received by the first terminal, and
a plurality of drivers that are provided corresponding to the plurality of semiconductor switches, respectively, and turn off the corresponding semiconductor switches in response to cutoff commands from the main controller,
each of the plurality of drivers includes a determination unit that determines whether or not the terminal-to-terminal voltage of the corresponding semiconductor switch matches the terminal-to-terminal voltage of another semiconductor switch of the plurality of semiconductor switches, and outputs a result of determination, and
the main controller detects a cutoff abnormality in which the plurality of semiconductor switches are not turned off normally, based on an output signal of the determination unit provided from each of the plurality of drivers,
the control device is configured such that two gate drivers determine whether or not terminal-to-terminal voltage of one semiconductor switch matches another terminal-to-terminal voltage.

2. The power supply device according to claim 1, wherein, in each of the plurality of drivers, the determination unit determines that the terminal-to-terminal voltage of the corresponding semiconductor switch does not match the terminal-to-terminal voltage of the other semiconductor switch, when a state where a result of comparison between a detection value of a voltage detector provided in the corresponding semiconductor switch and a threshold value does not match a result of comparison between a detection value of a voltage detector provided in the other semiconductor switch and the threshold value continues for a predetermined time.

3. The power supply device according to claim 1, wherein, in each of the plurality of drivers, the determination unit determines that the terminal-to-terminal voltage of the corresponding semiconductor switch does not match the terminal-to-terminal voltage of the other semiconductor switch, when a number of times that a state where a result of comparison between a detection value of a voltage detector provided in the corresponding semiconductor switch and a threshold value does not match a result of comparison between a detection value of a voltage detector provided in the other semiconductor switch and the threshold value is reached exceeds a predetermined number of times that is more than or equal to 2.

4. The power supply device according to claim 1, wherein, in each of the plurality of drivers, the determination unit determines that the terminal-to-terminal voltage of the corresponding semiconductor switch does not match the terminal-to-terminal voltage of the other semiconductor switch, when, within a first time after receiving the cutoff command from the main controller, a state where a result of comparison between a detection value of a voltage detector provided in the corresponding semiconductor switch and a threshold value does not match a result of comparison between a detection value of a voltage detector provided in the other semiconductor switch and the threshold value continues for a second time that is shorter than the first time.

5. The power supply device according to claim 1, further comprising a power converter that transmits and receives power between the second terminal and a power storage device, wherein
when the AC voltage is supplied normally from the AC power supply, the main controller turns on the plurality of semiconductor switches and the mechanical switches, and controls the power converter to convert the AC voltage into a DC voltage and supply the DC voltage to the power storage device, and
when the AC voltage is not supplied normally from the AC power supply, the main controller turns off the plurality of semiconductor switches and the mechanical switches, and controls the power converter to convert the DC voltage in the power storage device into an AC voltage and output the AC voltage to the second terminal.

6. The power supply device according to claim 1, wherein each of the plurality of semiconductor switches includes a semiconductor switching element and a snubber circuit connected in parallel with each other.

7. The power supply device according to claim 1, wherein
the plurality of semiconductor switches include first to n-th semiconductor switches (n is an integer more than or equal to 2),
the plurality of voltage detectors include first to n-th voltage detectors provided corresponding to the first to n-th semiconductor switches, respectively,
the plurality of drivers include first to n-th drivers provided corresponding to the first to n-th semiconductor switches, respectively,
in an i-th driver (i is an integer that is more than or equal to 2 and less than or equal to n), the determination unit determines whether or not a terminal-to-terminal voltage of an i-th semiconductor switch matches a terminal-to-terminal voltage of an (i−1)th semiconductor switch, in a first driver, the determination unit determines whether or not a terminal-to-terminal voltage of the first semiconductor switch matches a terminal-to-terminal voltage of the n-th semiconductor switch, and the main controller detects a cutoff abnormality of the first to n-th semiconductor switches, based on an output signal of the determination unit provided from each of the first to n-th drivers.

8. The power supply device according to claim 7, wherein the main controller detects a cutoff abnormality of the first to n-th semiconductor switches, when, in each of two or more drivers of the first to n-th drivers, the determination unit determines that terminal-to-terminal voltages of two semiconductor switches do not match.

9. The power supply device according to claim 7, wherein the main controller detects a failure of the first to n-th semiconductor switches, when, in only one driver of the first to n-th drivers, the determination unit determines that terminal-to-terminal voltages of two semiconductor switches do not match.

* * * * *